(12) United States Patent
Bodishbaugh et al.

(10) Patent No.: US 12,534,990 B2
(45) Date of Patent: Jan. 27, 2026

(54) POWER GENERATION ASSEMBLIES FOR HYDRAULIC FRACTURING SYSTEMS AND METHODS

(71) Applicant: ICE Thermal Harvesting, LLC, Houston, TX (US)

(72) Inventors: Adrian Benjamin Bodishbaugh, Houston, TX (US); Carrie Jeanne Murtland, Houston, TX (US)

(73) Assignee: ICE Thermal Harvesting, LLC, Houston, TX (US)

( * ) Notice: Subject to any disclaimer, the term of this patent is extended or adjusted under 35 U.S.C. 154(b) by 76 days.

(21) Appl. No.: 18/540,995

(22) Filed: Dec. 15, 2023

(65) Prior Publication Data

US 2024/0218772 A1    Jul. 4, 2024

Related U.S. Application Data

(60) Provisional application No. 63/480,197, filed on Jan. 17, 2023, provisional application No. 63/477,571, filed on Dec. 29, 2022.

(51) Int. Cl.
*F01K 25/00*     (2006.01)
*E21B 43/26*     (2006.01)
(Continued)

(52) U.S. Cl.
CPC .......... *E21B 43/26* (2013.01); *E21B 43/2607* (2020.05); *F01K 15/00* (2013.01); *F01K 25/00* (2013.01); *H02K 7/1823* (2013.01)

(58) Field of Classification Search
CPC ...... E21B 43/26; E21B 43/2607; F01K 15/00; F01K 25/00; F01K 25/10; H02K 7/1823
See application file for complete search history.

(56) References Cited

U.S. PATENT DOCUMENTS 1,982,745 A    12/1934   Koenemann
3,517,208 A    6/1970   Williams et al.
(Continued)

FOREIGN PATENT DOCUMENTS

AU    2007204830 A1    7/2007
AU    2009238733 B2    8/2013
(Continued)

OTHER PUBLICATIONS

Li et al., "Thermodynamic analysis of subcritical/transcritical ORCs with metal-organic heat carriers for efficient power 1 generation from low-grade thermal energy", Energy 255 (2022) 124519.
(Continued)

*Primary Examiner* — Matthew T Largi
(74) *Attorney, Agent, or Firm* — Womble Bond Dickinson (US) LLP

(57) ABSTRACT

Embodiments of systems and methods include a hydraulic fracturing assembly configured to inject a fracturing fluid into a subterranean formation. The hydraulic fracturing assembly includes a fracturing fluid reservoir and a power generation assembly. The power generation assembly includes an electrical generator. In addition, the power generation assembly includes a working fluid circuit connected to the electrical generator such that circulation of a working fluid along the working fluid circuit actuates the electrical generator to generate electrical power. Further, the power generation assembly includes a condenser connected along the working fluid circuit. The condenser is fluidly connected to the fracturing fluid reservoir such that heat is transferred from the working fluid to the fracturing fluid within the condenser.

34 Claims, 8 Drawing Sheets

(51) Int. Cl.
   *F01K 15/00*     (2006.01)
   *H02K 7/18*      (2006.01)

(56) References Cited

U.S. PATENT DOCUMENTS

| | | | |
|---|---|---|---|
| 3,757,516 A | 9/1973 | McCabe |
| 3,808,794 A | 5/1974 | Wood |
| 3,875,749 A | 4/1975 | Baciu |
| 3,908,381 A | 9/1975 | Barber et al. |
| 3,988,895 A | 11/1976 | Sheinbaum |
| 4,063,417 A | 12/1977 | Shields |
| 4,079,590 A | 3/1978 | Sheinbaum |
| 4,112,687 A | 9/1978 | Dixon |
| 4,112,745 A | 9/1978 | McCabe |
| 4,149,385 A | 4/1979 | Sheinbaum |
| 4,157,730 A | 6/1979 | Despois et al. |
| 4,191,021 A | 3/1980 | Nakamura |
| 4,224,796 A | 9/1980 | Stiel et al. |
| 4,228,657 A | 10/1980 | Leo |
| 4,275,563 A | 6/1981 | Kuroda |
| 4,292,808 A | 10/1981 | Lohmiller |
| 4,356,401 A | 10/1982 | Santi |
| 4,369,373 A | 1/1983 | Wiseman |
| 4,484,446 A | 11/1984 | Goldsberry |
| 4,542,625 A | 9/1985 | Bronicki |
| 4,558,568 A | 12/1985 | Hoshino et al. |
| 4,576,005 A | 3/1986 | Force |
| 4,590,384 A | 5/1986 | Bronicki |
| 4,982,568 A | 1/1991 | Kalina |
| 4,996,846 A | 3/1991 | Bronicki |
| 5,038,567 A | 8/1991 | Mortiz |
| 5,117,908 A | 6/1992 | Hofmann |
| 5,131,231 A | 7/1992 | Trimble |
| 5,199,507 A | 4/1993 | Westmoreland |
| 5,311,741 A | 5/1994 | Blaize |
| 5,421,157 A | 6/1995 | Rosenblatt |
| 5,440,882 A | 8/1995 | Kalina |
| 5,483,797 A | 1/1996 | Rigal et al. |
| 5,497,624 A | 3/1996 | Amir et al. |
| 5,517,822 A | 5/1996 | Haws et al. |
| 5,526,646 A | 6/1996 | Bronicki et al. |
| 5,555,731 A | 9/1996 | Rosenblatt |
| 5,570,579 A | 11/1996 | Larjola |
| 5,595,059 A | 1/1997 | Huber et al. |
| 5,598,706 A | 2/1997 | Bronicki et al. |
| 5,660,042 A | 8/1997 | Bronicki et al. |
| 5,661,977 A | 9/1997 | Shnell |
| 5,671,601 A | 9/1997 | Bronicki et al. |
| 5,685,362 A | 11/1997 | Brown |
| 5,816,048 A | 10/1998 | Bronicki et al. |
| 5,839,282 A | 11/1998 | Bronicki et al. |
| 5,860,279 A | 1/1999 | Bronicki et al. |
| RE36,282 E | 8/1999 | Nitschke |
| 5,970,714 A | 10/1999 | Bronicki et al. |
| 5,974,804 A | 11/1999 | Sterling |
| 6,073,448 A | 6/2000 | Lozada |
| 6,212,890 B1 | 4/2001 | Amir |
| 6,536,360 B2 | 3/2003 | O'Connor |
| 6,585,047 B2 | 7/2003 | Mcclung |
| 6,691,531 B1 | 2/2004 | Martinez |
| 6,695,061 B2 | 2/2004 | Fripp et al. |
| 6,724,687 B1 | 4/2004 | Stephenson et al. |
| 6,853,798 B1 | 2/2005 | Weiss |
| 6,857,268 B2 | 2/2005 | Stinger et al. |
| 6,857,486 B2 | 2/2005 | Chitwood et al. |
| 6,989,989 B2 | 1/2006 | Brasz et al. |
| 7,096,665 B2 | 8/2006 | Stinger et al. |
| 7,174,716 B2 | 2/2007 | Brasz et al. |
| 7,224,080 B2 | 5/2007 | Smedstad |
| 7,225,621 B2 | 6/2007 | Zimron et al. |
| 7,234,314 B1 | 6/2007 | Wiggs |
| 7,237,383 B2 | 7/2007 | Ahrens-Botzong et al. |
| 7,254,949 B2 | 8/2007 | Brasz et al. |
| 7,281,379 B2 | 10/2007 | Brasz |
| 7,287,381 B1 | 10/2007 | Pierson et al. |
| 7,289,325 B2 | 10/2007 | Brasz et al. |
| 7,313,926 B2 | 1/2008 | Gurin |
| 7,320,221 B2 | 1/2008 | Bronicki |
| 7,334,410 B2 | 2/2008 | Creighton et al. |
| 7,337,842 B2 | 3/2008 | Roddy et al. |
| 7,353,653 B2 | 4/2008 | Bronicki |
| 7,428,816 B2 | 9/2008 | Singh et al. |
| 7,472,548 B2 | 1/2009 | Meksvanh |
| 7,493,768 B2 | 2/2009 | Klaus et al. |
| 7,753,122 B2 | 7/2010 | Curlett |
| 7,823,386 B2 | 11/2010 | Zimron et al. |
| 7,891,187 B2 | 2/2011 | Mohr |
| 7,891,189 B2 | 2/2011 | Bottger et al. |
| 7,900,450 B2 | 3/2011 | Gurin |
| 7,926,276 B1 | 4/2011 | Dunn |
| 7,934,383 B2 | 5/2011 | Gutierrez et al. |
| 7,942,001 B2 | 5/2011 | Radcliff et al. |
| 7,950,230 B2 | 5/2011 | Nishikawa et al. |
| 7,987,676 B2 | 8/2011 | Ast et al. |
| 8,046,999 B2 | 11/2011 | Doty |
| 8,096,128 B2 | 1/2012 | Held et al. |
| 8,099,198 B2 | 1/2012 | Gurin |
| 8,146,360 B2 | 4/2012 | Myers et al. |
| 8,166,761 B2 | 5/2012 | Moghtaderi et al. |
| 8,193,659 B2 | 6/2012 | Bronicki et al. |
| 8,272,217 B2 | 9/2012 | Lengert |
| 8,309,498 B2 | 11/2012 | Funkhouser et al. |
| 8,371,099 B2 | 2/2013 | Gutierrez et al. |
| 8,381,523 B2 | 2/2013 | Zadok |
| 8,430,166 B2 | 4/2013 | Danko |
| 8,438,849 B2 | 5/2013 | Kaplan et al. |
| 8,459,029 B2 | 6/2013 | Lehar |
| 8,511,085 B2 | 8/2013 | Frey et al. |
| 8,528,333 B2 | 9/2013 | Juchymenko |
| 8,534,069 B2 | 9/2013 | Parrella |
| 8,555,643 B2 | 10/2013 | Kalina |
| 8,555,912 B2 | 10/2013 | Woolley et al. |
| 8,572,970 B2 | 11/2013 | Matteson et al. |
| 8,578,714 B2 | 11/2013 | Nagurny et al. |
| 8,596,066 B2 | 12/2013 | Zimron et al. |
| 8,616,000 B2 | 12/2013 | Parrella |
| 8,616,001 B2 | 12/2013 | Held et al. |
| 8,616,323 B1 | 12/2013 | Gurin |
| 8,656,720 B1 | 2/2014 | Hardgrave |
| 8,667,797 B2 | 3/2014 | Woodland |
| 8,667,799 B2 | 3/2014 | Batscha |
| 8,674,525 B2 | 3/2014 | Van den Bossche et al. |
| 8,680,704 B1 | 3/2014 | Rooney |
| 8,707,697 B2 | 4/2014 | Nitschke |
| 8,707,698 B2 | 4/2014 | Conry |
| 8,708,046 B2 | 4/2014 | Montgomery et al. |
| 8,720,563 B2 | 5/2014 | Joseph et al. |
| 8,752,382 B2 | 6/2014 | Lehar |
| 8,756,908 B2 | 6/2014 | Sheridan et al. |
| 8,771,603 B2 | 7/2014 | Harless et al. |
| 8,783,034 B2 | 7/2014 | Held |
| 8,791,054 B2 | 7/2014 | Deville |
| 8,820,075 B2 | 9/2014 | Kaminsky |
| 8,820,079 B2 | 9/2014 | Zyhowski et al. |
| 8,839,857 B2 | 9/2014 | Schultz et al. |
| 8,841,041 B2 | 9/2014 | Biederman et al. |
| 8,850,814 B2 | 10/2014 | Kaplan et al. |
| 8,857,186 B2 | 10/2014 | Held |
| 8,869,531 B2 | 10/2014 | Held |
| 8,881,805 B2 | 11/2014 | Klemencic |
| 8,919,123 B2 | 12/2014 | Gibble et al. |
| 8,959,914 B2 | 2/2015 | Kasuya et al. |
| 8,984,883 B2 | 3/2015 | Riley |
| 8,984,884 B2 | 3/2015 | Xu et al. |
| 9,003,798 B2 | 4/2015 | Yanagi |
| 9,014,791 B2 | 4/2015 | Held |
| 9,016,063 B2 | 4/2015 | Gaia et al. |
| 9,062,898 B2 | 6/2015 | Held et al. |
| 9,077,220 B2 | 7/2015 | Kyle et al. |
| 9,080,789 B2 | 7/2015 | Hamstra et al. |
| 9,091,278 B2 | 7/2015 | Vermeersch |
| 9,109,398 B2 | 8/2015 | Harris et al. |
| 9,115,603 B2 | 8/2015 | Leibowitz et al. |
| 9,115,604 B2 | 8/2015 | Bronicki |

(56) References Cited

U.S. PATENT DOCUMENTS

| | | |
|---|---|---|
| 9,118,226 B2 | 8/2015 | Kacludis et al. |
| 9,121,259 B2 | 9/2015 | Bryant et al. |
| 9,150,774 B2 | 10/2015 | Reddy et al. |
| 9,181,930 B2 | 11/2015 | Klemencic |
| 9,217,370 B2 | 12/2015 | Wang et al. |
| 9,234,522 B2 | 1/2016 | Jonsson et al. |
| 9,243,616 B2 | 1/2016 | Lee et al. |
| 9,297,367 B2 | 3/2016 | Ramaswamy et al. |
| 9,316,404 B2 | 4/2016 | Gurin |
| 9,322,300 B2 | 4/2016 | Mirmobin et al. |
| 9,331,547 B2 | 5/2016 | Bronicki |
| 9,341,084 B2 | 5/2016 | Xie et al. |
| 9,341,086 B2 | 5/2016 | Batscha et al. |
| 9,359,919 B1 | 6/2016 | Berry |
| 9,376,937 B2 | 6/2016 | Goswami et al. |
| 9,394,764 B2 | 7/2016 | Favilli et al. |
| 9,394,771 B2 | 7/2016 | Wiggs |
| 9,403,102 B2 | 8/2016 | Wu et al. |
| 9,441,504 B2 | 9/2016 | Held |
| 9,458,738 B2 | 10/2016 | Held et al. |
| 9,488,160 B2 | 11/2016 | Fisher et al. |
| 9,499,732 B2 | 11/2016 | Reddy et al. |
| 9,512,348 B2 | 12/2016 | Reyes et al. |
| 9,512,741 B2 | 12/2016 | Myogan et al. |
| 9,574,551 B2 | 2/2017 | Parrella, Sr. et al. |
| 9,587,161 B2 | 3/2017 | Fisk, Jr. |
| 9,587,162 B2 | 3/2017 | Fisk, Jr. |
| 9,638,065 B2 | 5/2017 | Vermeersch et al. |
| 9,649,582 B2 | 5/2017 | Shnell |
| 9,671,138 B2 | 6/2017 | Batscha et al. |
| 9,683,463 B2 | 6/2017 | Juchymenko |
| 9,726,157 B2 | 8/2017 | Sweatman et al. |
| 9,726,441 B2 | 8/2017 | Reissner et al. |
| 9,732,634 B2 | 8/2017 | Hikichi et al. |
| 9,745,870 B2 | 8/2017 | Johnson et al. |
| 9,759,096 B2 | 9/2017 | Vermeersch |
| 9,762,460 B2 | 9/2017 | Pawlowski et al. |
| 9,777,602 B2 | 10/2017 | Juchymenko |
| 9,784,140 B2 | 10/2017 | Huntington et al. |
| 9,784,248 B2 | 10/2017 | Batscha et al. |
| 9,797,273 B2 | 10/2017 | Nishiguchi et al. |
| 9,803,803 B1 | 10/2017 | Adams |
| 9,816,402 B2 | 11/2017 | Kauffman et al. |
| 9,816,443 B2 | 11/2017 | Sheridan et al. |
| 9,829,194 B2 | 11/2017 | Aumann et al. |
| 9,840,662 B2 | 12/2017 | Pascarella et al. |
| 9,845,423 B2 | 12/2017 | Frantz et al. |
| 9,863,282 B2 | 1/2018 | Hart et al. |
| 9,874,112 B2 | 1/2018 | Giegel |
| 9,932,861 B2 | 4/2018 | Preuss et al. |
| 9,932,970 B1 | 4/2018 | Jeter |
| 9,957,432 B2 | 5/2018 | Galindo et al. |
| 9,994,751 B2 | 6/2018 | Hulse et al. |
| 10,005,950 B2 | 6/2018 | Smith et al. |
| 10,024,198 B2 | 7/2018 | Held et al. |
| 10,059,870 B2 | 8/2018 | Joseph et al. |
| 10,060,283 B2 | 8/2018 | Tomigashi et al. |
| 10,060,302 B2 | 8/2018 | Weng et al. |
| 10,060,652 B2 | 8/2018 | Tahara |
| 10,077,683 B2 | 9/2018 | Close |
| 10,082,030 B2 | 9/2018 | Genrup et al. |
| 10,113,389 B2 | 10/2018 | Pandey et al. |
| 10,113,535 B2 | 10/2018 | Conlon |
| 10,138,405 B2 | 11/2018 | Kulkarni et al. |
| 10,138,560 B2 | 11/2018 | Reyes et al. |
| 10,221,770 B2 | 3/2019 | Sheridan |
| 10,227,893 B2 | 3/2019 | McCune et al. |
| 10,234,183 B2 | 3/2019 | Hashimoto |
| 10,247,044 B2 | 4/2019 | Barmeier et al. |
| 10,247,046 B2 | 4/2019 | Schuster et al. |
| 10,267,184 B2 | 4/2019 | Bowan et al. |
| 10,323,545 B2 | 6/2019 | Johnson |
| 10,352,197 B2 | 7/2019 | Grill et al. |
| 10,357,726 B2 | 7/2019 | Qin et al. |
| 10,400,635 B2 | 9/2019 | Johnson et al. |
| 10,435,604 B2 | 10/2019 | Kontomaris et al. |
| 10,436,075 B2 | 10/2019 | Freund et al. |
| 10,458,206 B2 | 10/2019 | Al-Dossary et al. |
| 10,465,104 B2 | 11/2019 | Ravi et al. |
| 10,465,491 B2 | 11/2019 | Moore |
| 10,472,994 B2 | 11/2019 | Avadhanula et al. |
| 10,494,897 B2 | 12/2019 | Pandey et al. |
| 10,495,098 B2 | 12/2019 | Preuss et al. |
| 10,519,814 B2 | 12/2019 | Quoilin |
| 10,527,026 B2 | 1/2020 | Muir et al. |
| 10,563,927 B2 | 2/2020 | Papadopoulos et al. |
| 10,570,777 B2 | 2/2020 | Bowan |
| 10,570,782 B2 | 2/2020 | Lintl et al. |
| 10,584,660 B2 | 3/2020 | Sheridan et al. |
| 10,590,324 B2 | 3/2020 | Kulkarni et al. |
| 10,590,802 B2 | 3/2020 | McCune et al. |
| 10,598,160 B2 | 3/2020 | Sumrall |
| 10,619,520 B2 | 4/2020 | Juchymenko |
| 10,626,709 B2 | 4/2020 | Al-Dossary |
| 10,670,340 B2 | 6/2020 | Batscha et al. |
| 10,724,805 B2 | 7/2020 | Barmeier et al. |
| 10,767,904 B2 | 9/2020 | von Düring |
| 10,788,267 B2 | 9/2020 | Dokic |
| 10,794,292 B2 | 10/2020 | Kupratis et al. |
| 10,883,388 B2 | 1/2021 | Held |
| 10,934,895 B2 | 3/2021 | Held et al. |
| 10,947,626 B2 | 3/2021 | Pinder et al. |
| 10,947,839 B2 | 3/2021 | Cuthbert et al. |
| 10,975,279 B2 | 4/2021 | Kontomaris et al. |
| 11,022,070 B2 | 6/2021 | Aumann et al. |
| 11,137,169 B2 | 10/2021 | Buscheck et al. |
| 11,168,673 B2 | 11/2021 | Younes et al. |
| 11,174,715 B2 | 11/2021 | Atisele |
| 11,187,112 B2 | 11/2021 | Held |
| 11,187,212 B1 | 11/2021 | Bodishbaugh et al. |
| 11,220,932 B2 | 1/2022 | Kontomaris et al. |
| 11,236,735 B1 | 2/2022 | Bodishbaugh et al. |
| 11,255,315 B1 | 2/2022 | Bodishbaugh et al. |
| 11,255,576 B2 | 2/2022 | Higgins et al. |
| 11,274,660 B2 | 3/2022 | Radke |
| 11,274,663 B1 | 3/2022 | Bodishbaugh et al. |
| 11,280,322 B1 | 3/2022 | Bodishbaugh et al. |
| 11,293,414 B1 | 4/2022 | Bodishbaugh et al. |
| 11,326,479 B2 | 5/2022 | Radke |
| 11,326,550 B1 | 5/2022 | Bodishbaugh et al. |
| 11,359,576 B1 | 6/2022 | Bodishbaugh et al. |
| 11,359,612 B1 | 6/2022 | Bodishbaugh et al. |
| 11,365,652 B2 | 6/2022 | Gaia et al. |
| 11,396,828 B2 | 7/2022 | Chase |
| 11,421,625 B1 | 8/2022 | Bodishbaugh et al. |
| 11,421,663 B1 | 8/2022 | Bodishbaugh et al. |
| 11,480,074 B1 | 10/2022 | Bodishbaugh et al. |
| 11,486,330 B2 | 11/2022 | Bodishbaugh et al. |
| 11,486,370 B2 | 11/2022 | Bodishbaugh et al. |
| 11,493,029 B2 | 11/2022 | Bodishbaugh et al. |
| 11,542,888 B2 | 1/2023 | Bodishbaugh et al. |
| 11,549,402 B2 | 1/2023 | Bodishbaugh et al. |
| 11,572,849 B1 | 2/2023 | Bodishbaugh et al. |
| 11,578,706 B2 | 2/2023 | Bodishbaugh et al. |
| 11,592,009 B2 | 2/2023 | Bodishbaugh et al. |
| 11,598,320 B2 | 3/2023 | Bodishbaugh et al. |
| 11,624,355 B2 | 4/2023 | Bodishbaugh et al. |
| 11,644,014 B2 | 5/2023 | Bodishbaugh et al. |
| 11,644,015 B2 | 5/2023 | Bodishbaugh et al. |
| 11,668,209 B2 | 6/2023 | Bodishbaugh et al. |
| 11,680,541 B2 | 6/2023 | Bodishbaugh et al. |
| 11,732,697 B2 | 8/2023 | Bodishbaugh et al. |
| 11,761,353 B2 | 9/2023 | Bodishbaugh et al. |
| 11,761,433 B2 | 9/2023 | Bodishbaugh et al. |
| 11,773,805 B2 | 10/2023 | Bodishbaugh et al. |
| 11,879,409 B2 | 1/2024 | Bodishbaugh et al. |
| 11,905,934 B2 | 2/2024 | Bodishbaugh et al. |
| 11,933,279 B2 | 3/2024 | Bodishbaugh |
| 11,933,280 B2 | 3/2024 | Bodishbaugh |
| 11,946,459 B2 | 4/2024 | Bodishbaugh |
| 11,959,466 B2 | 4/2024 | Bodishbaugh |
| 11,971,019 B2 | 4/2024 | Bodishbaugh |
| 12,049,875 B2 | 7/2024 | Bodishbaugh |
| 12,060,867 B2 | 8/2024 | Bodishbaugh |

(56) References Cited

U.S. PATENT DOCUMENTS

| | | |
|---|---|---|
| 12,104,553 B2 | 10/2024 | Bodishbaugh |
| 12,110,878 B2 | 10/2024 | Bodishbaugh |
| 12,135,016 B2 | 11/2024 | Bodishbaugh |
| 12,140,124 B2 | 11/2024 | Bodishbaugh |
| 12,146,475 B2 | 11/2024 | Bodishbaugh |
| 12,163,485 B2 | 12/2024 | Bodishbaugh |
| 12,180,861 B1 | 12/2024 | Bodishbaugh |
| 12,305,624 B2 | 5/2025 | Bodishbaugh et al. |
| 12,312,981 B2 | 5/2025 | Bodishbaugh et al. |
| 12,385,474 B2 | 8/2025 | Bodishbaugh et al. |
| 12,454,896 B2 | 10/2025 | Bodishbaugh et al. |
| 2002/0178723 A1 | 12/2002 | Bronicki et al. |
| 2003/0010652 A1 | 1/2003 | Hunt |
| 2003/0029169 A1 | 2/2003 | Hanna et al. |
| 2004/0237890 A1 | 12/2004 | Bour |
| 2005/0034467 A1 | 2/2005 | Varney |
| 2005/0109495 A1 | 5/2005 | Cheng et al. |
| 2005/0247056 A1 | 11/2005 | Cogswell et al. |
| 2005/0247059 A1 | 11/2005 | Cogswell et al. |
| 2006/0026961 A1 | 2/2006 | Bronicki |
| 2006/0130480 A1 | 6/2006 | Lovelace |
| 2007/0025854 A1 | 2/2007 | Moore et al. |
| 2008/0095611 A1 | 4/2008 | Storage |
| 2008/0168772 A1 | 7/2008 | Radcliff et al. |
| 2008/0217523 A1 | 9/2008 | O'Sullivan |
| 2009/0071155 A1 | 3/2009 | Boyapati |
| 2009/0211253 A1* | 8/2009 | Radcliff ............... F01K 23/065 60/670 |
| 2009/0217664 A1 | 9/2009 | Rapp et al. |
| 2009/0313999 A1 | 12/2009 | Hunter |
| 2009/0320477 A1 | 12/2009 | Juchymenko |
| 2010/0018207 A1 | 1/2010 | Juchymenko |
| 2010/0034684 A1 | 2/2010 | Ast |
| 2010/0045042 A1 | 2/2010 | Hinders et al. |
| 2010/0071366 A1 | 3/2010 | Klemencic |
| 2010/0071409 A1 | 3/2010 | Kaart |
| 2010/0077752 A1 | 4/2010 | Papile |
| 2010/0077792 A1 | 4/2010 | Gurin |
| 2010/0187319 A1 | 7/2010 | Isom et al. |
| 2010/0192573 A1 | 8/2010 | Hamilton |
| 2010/0194111 A1 | 8/2010 | Van den Bossche et al. |
| 2010/0218930 A1 | 9/2010 | Proeschel |
| 2010/0300093 A1 | 12/2010 | Doty |
| 2010/0319354 A1 | 12/2010 | Guidati et al. |
| 2011/0000210 A1 | 1/2011 | Miles |
| 2011/0000227 A1 | 1/2011 | Kamiya |
| 2011/0030404 A1 | 2/2011 | Gurin et al. |
| 2011/0041502 A1 | 2/2011 | Zimron et al. |
| 2011/0041505 A1 | 2/2011 | Kasuya et al. |
| 2011/0083620 A1 | 4/2011 | Yoon |
| 2011/0100003 A1 | 5/2011 | McLeod et al. |
| 2011/0126539 A1 | 6/2011 | Ramaswamy et al. |
| 2011/0138809 A1 | 6/2011 | Ramaswamy et al. |
| 2011/0175358 A1 | 7/2011 | Langson |
| 2011/0272166 A1 | 11/2011 | Hunt |
| 2011/0314818 A1 | 12/2011 | Breen et al. |
| 2012/0001429 A1 | 1/2012 | Saar et al. |
| 2012/0042650 A1 | 2/2012 | Ernst et al. |
| 2012/0111004 A1 | 5/2012 | Conry |
| 2012/0131918 A1 | 5/2012 | Held |
| 2012/0145397 A1 | 6/2012 | Schultz et al. |
| 2012/0174581 A1 | 7/2012 | Vaughan et al. |
| 2012/0174622 A1 | 7/2012 | Granier |
| 2012/0192560 A1 | 8/2012 | Ernst et al. |
| 2012/0198844 A1 | 8/2012 | Kaminsky |
| 2012/0261092 A1 | 10/2012 | Heath et al. |
| 2012/0291433 A1 | 11/2012 | Meng et al. |
| 2012/0292112 A1 | 11/2012 | Lakic |
| 2012/0292909 A1 | 11/2012 | Erikson |
| 2012/0315158 A1 | 12/2012 | Klaus |
| 2013/0041068 A1 | 2/2013 | Reddy et al. |
| 2013/0067910 A1 | 3/2013 | Ishiguro et al. |
| 2013/0091843 A1 | 4/2013 | Zyhowski et al. |
| 2013/0129496 A1 | 5/2013 | Eckert |
| 2013/0139509 A1 | 6/2013 | Berti |
| 2013/0168089 A1 | 7/2013 | Berg et al. |
| 2013/0168964 A1 | 7/2013 | Xu et al. |
| 2013/0186089 A1 | 7/2013 | Bruckner |
| 2013/0217604 A1 | 8/2013 | Fisk, Jr. |
| 2013/0227947 A1 | 9/2013 | Bronicki et al. |
| 2013/0247569 A1 | 9/2013 | Suter |
| 2013/0298568 A1 | 11/2013 | Pierson et al. |
| 2013/0299123 A1 | 11/2013 | Matula |
| 2013/0299170 A1 | 11/2013 | Joseph et al. |
| 2013/0341010 A1* | 12/2013 | Nevison ............... E21B 43/2605 166/250.01 |
| 2014/0011908 A1 | 1/2014 | Reddy et al. |
| 2014/0026574 A1 | 1/2014 | Leibowitz et al. |
| 2014/0033713 A1 | 2/2014 | Juchymenko |
| 2014/0057810 A1 | 2/2014 | Fisk, Jr. |
| 2014/0087978 A1 | 3/2014 | Deville |
| 2014/0102098 A1 | 4/2014 | Bowan et al. |
| 2014/0102103 A1 | 4/2014 | Yamamoto |
| 2014/0123643 A1 | 5/2014 | Ming |
| 2014/0130498 A1 | 5/2014 | Randolph |
| 2014/0158429 A1 | 6/2014 | Kader et al. |
| 2014/0178180 A1 | 6/2014 | Sheridan |
| 2014/0206912 A1 | 7/2014 | Iglesias |
| 2014/0224469 A1 | 8/2014 | Mirmobin et al. |
| 2014/0296113 A1 | 10/2014 | Reyes et al. |
| 2014/0305125 A1 | 10/2014 | Wang et al. |
| 2014/0360702 A1* | 12/2014 | Cook ..................... F23D 14/66 165/104.31 |
| 2014/0366540 A1 | 12/2014 | Zyhowski et al. |
| 2015/0021924 A1 | 1/2015 | Parella |
| 2015/0047351 A1 | 2/2015 | Ishikawa et al. |
| 2015/0135708 A1 | 5/2015 | Lutz et al. |
| 2015/0192038 A1 | 7/2015 | Sharp et al. |
| 2015/0226500 A1 | 8/2015 | Reissner et al. |
| 2015/0252653 A1 | 9/2015 | Shelton, Jr. |
| 2015/0300327 A1 | 10/2015 | Sweatman et al. |
| 2015/0330261 A1 | 11/2015 | Held |
| 2015/0345341 A1 | 12/2015 | Kacludis et al. |
| 2015/0345482 A1 | 12/2015 | Klitzing et al. |
| 2015/0361831 A1 | 12/2015 | Myers |
| 2016/0003108 A1 | 1/2016 | Held et al. |
| 2016/0010512 A1 | 1/2016 | Close |
| 2016/0017758 A1 | 1/2016 | Vermeersch et al. |
| 2016/0017759 A1 | 1/2016 | Gayawal et al. |
| 2016/0040557 A1 | 2/2016 | Vermeersch et al. |
| 2016/0047540 A1 | 2/2016 | Aumann et al. |
| 2016/0061055 A1 | 3/2016 | Bowan |
| 2016/0076405 A1 | 3/2016 | Hashimoto et al. |
| 2016/0084115 A1 | 3/2016 | Ludewig et al. |
| 2016/0130985 A1 | 5/2016 | O'Connor et al. |
| 2016/0160111 A1 | 6/2016 | Smith et al. |
| 2016/0177887 A1 | 6/2016 | Fischer |
| 2016/0201521 A1 | 7/2016 | Karthauser |
| 2016/0222275 A1 | 8/2016 | Galindo et al. |
| 2016/0257869 A1 | 9/2016 | Kulkarni et al. |
| 2016/0312646 A1 | 10/2016 | Juano |
| 2016/0340572 A1 | 11/2016 | Pascarella et al. |
| 2016/0369408 A1 | 12/2016 | Reyes et al. |
| 2017/0058181 A1 | 3/2017 | Frantz et al. |
| 2017/0058722 A1 | 3/2017 | Noureldin et al. |
| 2017/0130614 A1 | 5/2017 | Held et al. |
| 2017/0145815 A1 | 5/2017 | Cuthbert et al. |
| 2017/0159504 A1 | 6/2017 | Ostrom et al. |
| 2017/0175582 A1 | 6/2017 | McCune et al. |
| 2017/0175583 A1 | 6/2017 | McCune et al. |
| 2017/0211829 A1 | 7/2017 | Slack |
| 2017/0226402 A1 | 8/2017 | Patil et al. |
| 2017/0233635 A1 | 8/2017 | Pandey et al. |
| 2017/0240794 A1 | 8/2017 | Iverson et al. |
| 2017/0254223 A1 | 9/2017 | Goethals et al. |
| 2017/0254226 A1 | 9/2017 | Heber et al. |
| 2017/0261268 A1 | 9/2017 | Barmeier et al. |
| 2017/0276026 A1 | 9/2017 | Barmeier et al. |
| 2017/0276435 A1 | 9/2017 | Papadopoulos et al. |
| 2017/0284230 A1 | 10/2017 | Juchymenko |
| 2017/0314420 A1 | 11/2017 | Bowan et al. |
| 2017/0321104 A1 | 11/2017 | Ravi et al. |
| 2017/0321107 A1 | 11/2017 | Joseph et al. |
| 2017/0362963 A1 | 12/2017 | Hostler et al. |

(56) References Cited

U.S. PATENT DOCUMENTS

| | | |
|---|---|---|
| 2017/0370251 A1 | 12/2017 | McGrail |
| 2018/0094548 A1 | 4/2018 | Jeter |
| 2018/0128131 A1 | 5/2018 | Zyhowski et al. |
| 2018/0135468 A1* | 5/2018 | Kayahara ............... F02C 9/28 |
| 2018/0179960 A1 | 6/2018 | Apte et al. |
| 2018/0224164 A1 | 8/2018 | Lakic |
| 2018/0274524 A1 | 9/2018 | Moncarz et al. |
| 2018/0313232 A1 | 11/2018 | Auciello |
| 2018/0313340 A1 | 11/2018 | Spadacini et al. |
| 2018/0328138 A1 | 11/2018 | Pandey et al. |
| 2018/0340450 A1 | 11/2018 | Avadhanula et al. |
| 2018/0355703 A1 | 12/2018 | Al-Dossary |
| 2018/0356044 A1 | 12/2018 | Monti et al. |
| 2019/0048759 A1 | 2/2019 | Noureldin et al. |
| 2019/0055445 A1 | 2/2019 | Kulkarni et al. |
| 2019/0128147 A1 | 5/2019 | Liu et al. |
| 2019/0128567 A1 | 5/2019 | Redfern |
| 2019/0390660 A1 | 12/2019 | McBay |
| 2020/0011426 A1 | 1/2020 | Juchymenko |
| 2020/0025032 A1 | 1/2020 | McCune et al. |
| 2020/0041071 A1 | 2/2020 | Werlen |
| 2020/0095899 A1 | 3/2020 | Merswolke et al. |
| 2020/0200123 A1 | 6/2020 | Aumann et al. |
| 2020/0200483 A1 | 6/2020 | Ahlbom |
| 2020/0217304 A1 | 7/2020 | Sumrall |
| 2020/0232342 A1 | 7/2020 | McCune et al. |
| 2020/0248063 A1 | 8/2020 | Stone |
| 2020/0292240 A1* | 9/2020 | Chase ............... F01K 17/005 |
| 2020/0308992 A1 | 10/2020 | Juchymenko |
| 2020/0309101 A1 | 10/2020 | Muir et al. |
| 2020/0354839 A1 | 11/2020 | Pinder et al. |
| 2020/0386212 A1 | 12/2020 | Atisele |
| 2020/0399524 A1 | 12/2020 | Pisklak et al. |
| 2021/0017439 A1 | 1/2021 | Ramirez Angulo et al. |
| 2021/0047963 A1 | 2/2021 | Conde |
| 2021/0062682 A1 | 3/2021 | Higgins et al. |
| 2021/0071063 A1 | 3/2021 | Stone |
| 2021/0140684 A1 | 5/2021 | Younes et al. |
| 2021/0172344 A1 | 6/2021 | Juchymenko |
| 2021/0205738 A1 | 7/2021 | Blomqvist et al. |
| 2021/0215440 A1* | 7/2021 | Morris ............... F02C 6/18 |
| 2021/0285693 A1 | 9/2021 | Gerson |
| 2021/0372668 A1 | 12/2021 | Buscheck et al. |
| 2021/0396116 A1* | 12/2021 | Yeung ............... F04B 23/04 |
| 2021/0404309 A1* | 12/2021 | Yeung ............... E21B 43/2607 |
| 2022/0090521 A1 | 3/2022 | Kontomaris et al. |
| 2022/0186984 A1 | 6/2022 | Gaia et al. |
| 2022/0389844 A1* | 12/2022 | Zemlak ............... F02C 6/18 |
| 2024/0026838 A1 | 1/2024 | Bodishbaugh et al. |
| 2024/0093660 A1 | 3/2024 | Bodishbaugh et al. |
| 2024/0159224 A1 | 5/2024 | Bodishbaugh |
| 2024/0159225 A1 | 5/2024 | Bodishbaugh |
| 2024/0191703 A1 | 6/2024 | Bodishbaugh |
| 2024/0209844 A1 | 6/2024 | Bodishbaugh |
| 2024/0254973 A1 | 8/2024 | Bodishbaugh |
| 2024/0309856 A1 | 9/2024 | Bodishbaugh |

FOREIGN PATENT DOCUMENTS

| | | |
|---|---|---|
| AU | 2011336831 B2 | 12/2016 |
| AU | 2012306439 B2 | 3/2017 |
| AU | 2014225990 B2 | 7/2018 |
| CA | 2692629 | 1/2009 |
| CA | 2698334 | 4/2009 |
| CA | 2676502 A1 | 2/2011 |
| CA | 2679612 | 5/2018 |
| CA | 2676502 | 12/2018 |
| CA | 2952379 C | 4/2019 |
| CN | 204661610 U | 9/2015 |
| CN | 103174473 | 10/2015 |
| CN | 102812212 | 4/2016 |
| CN | 103174475 | 8/2016 |
| CN | 106517718 | 3/2017 |
| CN | 107246550 | 10/2017 |
| CN | 107387176 A | 11/2017 |
| CN | 107461221 A | 12/2017 |
| CN | 108302946 A | 7/2018 |
| CN | 108457609 A | 8/2018 |
| CN | 207761721 U | 8/2018 |
| CN | 209457990 U | 10/2019 |
| CN | 209704638 U | 11/2019 |
| CN | 111837006 | 10/2020 |
| CN | 111911255 | 11/2020 |
| CN | 113137286 A | 7/2021 |
| CN | 113266815 A | 8/2021 |
| CN | 113983844 A | 1/2022 |
| CN | 114370309 A | 4/2022 |
| CN | 216922244 U | 7/2022 |
| DE | 10337240 A1 | 3/2005 |
| DE | 102011006066 A1 | 9/2012 |
| DE | 102012214907 A1 | 10/2013 |
| DE | 102012014443 | 1/2014 |
| DE | 102013009351 | 1/2014 |
| DE | 102018201172 A1 | 7/2019 |
| EP | 0652368 | 5/1995 |
| EP | 1507069 A1 | 2/2005 |
| EP | 2530255 A2 | 12/2012 |
| EP | 2201666 | 3/2013 |
| EP | 1573173 | 4/2013 |
| EP | 1713877 | 5/2013 |
| EP | 1869293 | 5/2013 |
| EP | 2222939 | 11/2013 |
| EP | 1706667 B1 | 10/2014 |
| EP | 2167872 | 2/2016 |
| EP | 2446122 B1 | 8/2017 |
| EP | 2478201 B1 | 8/2017 |
| EP | 3102796 B1 | 1/2018 |
| EP | 2550436 B1 | 8/2019 |
| EP | 3464836 | 4/2020 |
| EP | 3631173 A1 | 4/2020 |
| EP | 2948649 B1 | 12/2020 |
| EP | 3540331 B1 | 12/2020 |
| FR | 2738872 | 3/1997 |
| GB | 2336943 | 6/2003 |
| IN | 247090 | 12/2003 |
| IN | 256000 | 1/2005 |
| IN | 202111000822 | 10/2021 |
| JP | 08192150 | 7/1996 |
| JP | 2001183030 | 7/2001 |
| JP | 2009127627 A | 6/2009 |
| JP | 2010166805 A | 7/2010 |
| JP | 2010249501 A | 11/2010 |
| JP | 2010249502 A | 11/2010 |
| JP | 2011064451 A | 3/2011 |
| JP | 4668189 B2 | 4/2011 |
| JP | 2011069370 A | 4/2011 |
| JP | 2011106459 A | 6/2011 |
| JP | 2011137449 A | 7/2011 |
| JP | 2013151931 A | 8/2013 |
| JP | 2013238228 A | 11/2013 |
| JP | 2014016124 A | 1/2014 |
| JP | 2014080975 A | 5/2014 |
| JP | 2014109279 A | 6/2014 |
| JP | 2015149885 A | 8/2015 |
| JP | 2016006323 A | 1/2016 |
| JP | 2016105687 A | 6/2016 |
| JP | 2016188640 A | 11/2016 |
| JP | 2021167601 A | 10/2021 |
| KR | 101126833 | 3/2012 |
| KR | 20120067710 | 6/2012 |
| KR | 20130023578 A | 3/2013 |
| KR | 1691908 | 1/2017 |
| KR | 2075550 | 2/2020 |
| KR | 2185002 | 12/2020 |
| NZ | 581457 | 11/2011 |
| RU | 2006142350 | 6/2008 |
| SG | 191467 | 7/2013 |
| SG | 191468 | 7/2013 |
| SG | 192327 | 8/2013 |
| WO | 1993/001397 | 1/1993 |
| WO | 1994028298 | 12/1994 |
| WO | 2005014981 A1 | 2/2005 |
| WO | 2005019606 A1 | 3/2005 |
| WO | 2005049975 | 6/2005 |

(56) References Cited

FOREIGN PATENT DOCUMENTS

| | | |
|---|---|---|
| WO | 2005100755 A1 | 10/2005 |
| WO | 2006/014609 | 2/2006 |
| WO | 2006/027770 | 3/2006 |
| WO | 2006060253 | 6/2006 |
| WO | 2006/092786 | 9/2006 |
| WO | 2006138459 | 12/2006 |
| WO | 2007048999 | 5/2007 |
| WO | 20070079245 | 7/2007 |
| WO | 2007137373 | 12/2007 |
| WO | 2008052809 | 5/2008 |
| WO | 2008106774 A1 | 9/2008 |
| WO | 2008125827 | 10/2008 |
| WO | 2009017471 | 2/2009 |
| WO | 2009017474 | 2/2009 |
| WO | 2009027302 A2 | 3/2009 |
| WO | 2009030283 A2 | 3/2009 |
| WO | 2009/058112 | 5/2009 |
| WO | 2009095127 A2 | 8/2009 |
| WO | 2009/142608 | 11/2009 |
| WO | 2010021618 | 2/2010 |
| WO | 2010/039448 | 4/2010 |
| WO | 2010/065895 | 6/2010 |
| WO | 2009017473 | 8/2010 |
| WO | 2010106089 A2 | 9/2010 |
| WO | 2010127932 A2 | 11/2010 |
| WO | 2010/143046 | 12/2010 |
| WO | 2010/143049 | 12/2010 |
| WO | 2011012047 A1 | 2/2011 |
| WO | 2011/066032 | 6/2011 |
| WO | 2011073469 | 6/2011 |
| WO | 2011/061601 | 8/2011 |
| WO | 2011/103560 | 8/2011 |
| WO | 2011093854 | 8/2011 |
| WO | 2011/137980 | 11/2011 |
| WO | 2012060510 | 5/2012 |
| WO | 2012/079694 | 6/2012 |
| WO | 2012074940 A2 | 6/2012 |
| WO | 2012/112889 | 8/2012 |
| WO | 2012/142765 | 10/2012 |
| WO | 2012/151447 | 11/2012 |
| WO | 2013/014509 | 1/2013 |
| WO | 2013059695 | 4/2013 |
| WO | 2013/082575 | 6/2013 |
| WO | 2013103592 | 7/2013 |
| WO | 2013110375 A2 | 8/2013 |
| WO | 2013115668 A1 | 8/2013 |
| WO | 2013/136131 | 9/2013 |
| WO | 2014019755 A1 | 2/2014 |
| WO | 2014042580 | 3/2014 |
| WO | 2014053292 A2 | 4/2014 |
| WO | 2014059235 A1 | 4/2014 |
| WO | 2014065977 | 5/2014 |
| WO | 2014/124061 | 8/2014 |
| WO | 2014/167795 | 10/2014 |
| WO | 2014154405 A1 | 10/2014 |
| WO | 2014159520 A1 | 10/2014 |
| WO | 2014159587 A1 | 10/2014 |
| WO | 2014160257 A1 | 10/2014 |
| WO | 2014164620 | 10/2014 |
| WO | 2014164620 A1 | 10/2014 |
| WO | 2014165053 | 10/2014 |
| WO | 2014165053 A1 | 10/2014 |
| WO | 2014165144 A1 | 10/2014 |
| WO | 2014191157 A2 | 12/2014 |
| WO | 2015/040279 | 3/2015 |
| WO | 2015034987 A1 | 3/2015 |
| WO | 2015/059069 | 4/2015 |
| WO | 2015078829 A1 | 6/2015 |
| WO | 2015/135796 | 9/2015 |
| WO | 2015131940 A1 | 9/2015 |
| WO | 2015/158600 | 10/2015 |
| WO | 2015192005 A1 | 12/2015 |
| WO | 2016039655 A1 | 3/2016 |
| WO | 2016049712 | 4/2016 |
| WO | 2016050365 A1 | 4/2016 |
| WO | 2016050366 A1 | 4/2016 |
| WO | 2016050367 A1 | 4/2016 |
| WO | 2016050368 A1 | 4/2016 |
| WO | 2016050369 A1 | 4/2016 |
| WO | 2016/069242 | 5/2016 |
| WO | 2013103631 | 5/2016 |
| WO | 2016073245 A1 | 5/2016 |
| WO | 2016/087920 | 6/2016 |
| WO | 2016099975 A1 | 6/2016 |
| WO | 2016147419 | 9/2016 |
| WO | 2016/196144 | 12/2016 |
| WO | 2016204287 | 12/2016 |
| WO | 2017041147 | 3/2017 |
| WO | 2017065683 | 4/2017 |
| WO | 2017123132 | 7/2017 |
| WO | 2017/146712 | 8/2017 |
| WO | 2017/147400 | 8/2017 |
| WO | 2017203447 | 11/2017 |
| WO | 2018/044690 | 3/2018 |
| WO | 2018/107279 | 6/2018 |
| WO | 2018106528 | 6/2018 |
| WO | 2018/210528 | 11/2018 |
| WO | 2018217969 A1 | 11/2018 |
| WO | 2018227068 A1 | 12/2018 |
| WO | 2019004910 | 1/2019 |
| WO | 2019060844 | 3/2019 |
| WO | 2019067618 | 4/2019 |
| WO | 2019086960 A1 | 5/2019 |
| WO | 3514339 A1 | 7/2019 |
| WO | 2019/157341 | 8/2019 |
| WO | 2019155240 | 8/2019 |
| WO | 2019/178447 | 9/2019 |
| WO | 2020152485 | 7/2020 |
| WO | 2020153896 | 7/2020 |
| WO | 2020/186044 | 9/2020 |
| WO | 2020201843 | 10/2020 |
| WO | 2020/229901 | 11/2020 |
| WO | 2020/097714 | 12/2020 |
| WO | 2020239067 | 12/2020 |
| WO | 2020239068 | 12/2020 |
| WO | 2020239069 | 12/2020 |
| WO | 2020251980 A1 | 12/2020 |
| WO | 2021004882 | 1/2021 |
| WO | 2021013465 A1 | 1/2021 |
| WO | 2021096696 A1 | 5/2021 |
| WO | 2021107834 | 6/2021 |
| WO | 2022/061320 | 3/2022 |

OTHER PUBLICATIONS

International Search Report and Written Opinion for PCT/US2022/071480, Aug. 3, 2022.

International Search Report and Written Opinion for PCT/US2022/071482, Aug. 2, 2022.

Richter, Alexander, GreenFire Energy and Mitsui Oil Exploration Co. are partnering on a closed-loop geothermal pilot project in Japan, Think GeoEnergy, Apr. 6, 2021.

Edwards, Alex, Dallas Innovates, Hunt Energy Network's New Venture Will Put 50 Batteries Across Texas, Giving ERCOT a Portfolio of Energy Generation, Apr. 1, 2021.

Guo, Boyun, Petroleum Enginnering, A Computer-Assisted Approach, Dec. 21, 2006.

Li, Tailu et al., Cascade utilization of low temperature geothermal water in oilfield combined power generation, gathering heat tracing and oil recovery, Applied Thermal Engineering 40 (2012).

Sherven, Bob, Automation Maximizes performance for shale wells, Oil&Gas Journal, 2013.

Hu, Kaiyong et al., A case study of an ORC geothermal power demonstration system under partial load conditions in Huabei Oilfield, China, ScientDirect, 2017.

Liu, Xiaolei et al., A systematic study of harnessing low-temperature geothermal energy from oil and gas reservoirs, Elsevier, ScienceDirect, Energy, 2017.

Wang, Kai, et al., A comprehensive review of geothermal energy extraction and utilization in oilfields, Elsevier, ScienceDirect, Journal of Petroleum Science and Engineering, 2017.

(56) References Cited

OTHER PUBLICATIONS

Cutright, Bruce L., The Transformation of Tight Shale Gas Reservoirs to Geothermal Energy Production, Bureau of Economic Geology University of Texas, Austin Texas, Jun. 14, 2011.
Khennich, Mohammed et al., Optimal Design of ORC Systems with a Low-Temperature Heat Source, Entropy 2012, 14, 370-389; doi:10.3390/e14020370.
Dambly, Benjamin W., et al., The Organic Rankine Cycle for Geothermal Power Generation, Geothermal Energy, 2007.
Obi, John Besong, State of art on ORC applications for waste heat recovery and micro-cogeneration for installations up to 100kWe, Elsevier, Energy Procedia 82 ( 2015 ) 994-1001.
Obafunmi, Jaiyejeje Sunday, Thermodynamic Analysis of Organic Rankine Cycles, Eastern Mediterranean University Jul. 2014, Gazimausa, North Cyprus.
Dong, Bensi et al., Potential of low temperature organic Rankine cycle with zeotropic mixtures as working fluid, Elsevier, ScienceDirect, Energy Procedia 105 ( 2017 ) 1489-1494.
Iqbal, MdArbab et al., Trilateral Flash Cycle (TFC): a promising thermodynamic cycle for low grade heat to power generation, Elsevier, ScienceDirect, Energy Procedia 160 (2019) 208-214.
Bao, Junjiang et al., A review of working fluid and expander selections for organic Rankine cycle, Elsevier, ScienceDirect, Renewable and Sustainable Energy Reviews 24 (2013) 325-342.
Ajimotokan, Habeeb A. et al., Trilateral Flash Cycle for Recovery of Power from a Finite Low-Grade Heat Source, Proceedings of the 24th European Symposium on Computer Aided Process Engineering—ESCAPE Jun. 15-18, 24, 2014, Budapest, Hungary. Copyright © 2014 Elsevier B.V.
HUNG Tzu-Chen, et al., The Development and Application of a Small-Scale Organic Rankine Cycle for Waste Heat Recovery, IntechOpen, 2019.
Kong, Rithy et al., Thermodynamic performance analysis of a R245fa organic Rankine cycle (ORC) with different kinds of heat sources at evaporator, Elsevier, ScienceDirect, Case Studies in Thermal Engineering 13 (2019) 100385.
Lukawski, Maciej Z. et al., Impact of molecular structure of working fluids on performance of organic Rankine cycles (ORCs), Sustainable Energy Fuels, 2017, 1, 1098.
Saleh, Bahaa et al., Working fluids for low-temperature organic Rankine cycles, Elsevier, ScienceDirect, Energy 32 (2007) 1210-1221.
Brasz, Lars J. et al., Ranking of Working Fluids for Organic Rankine Cycle Applications, Purdue University, Purdue e-Pubs, (2004). International Refrigeration and Air Conditioning Conference. Paper 722.
Miller, Patrick C., Research uses landfill gas tech for Bakken flaring solution, The Bakken magazine, Sep. 16, 2015.
Electratherm, Inc., Power+ Generator 4400B & 4400B+, Nov. 24, 2020.
Electratherm, Inc., Heat To Power Generation Base Load Renewable Energy, Mar. 2020.
Electratherm, Inc., Power+ Generator, Nov. 25, 2020.
Electra Therm, Inc., Generating Clean Power From Waste Heat, Nov. 2020.
ElectraTherm, Inc., Power+ Generator, May 19, 2020.
Sneary, Loy et al., Gulf Coast Green Energy, Flare Gas Reduction Trial Using an Organic Rankine Cycle Generator, Jan. 11, 2016.
Enertime, Orc for Industrial Waste Heat Recovery, Aug. 2017.
Enogia, Generate power from your waste heat thanks to our ORC, 2019.
UTC Power, PureCycle, 200 Heat-to-Electricity Power System, 2004.
Rank, MT3 machine, Dec. 17, 2018.
Heat Recovery Solutions, Clean Cycle Containerized Solution, 2009.
Triogen BV, Specification: E-Box Engine Application, Feb. 15, 2019.
"From Waste Heat To High Performance", PBOG (Permian Basin Oil and Gas Magazine), Apr. 26, 2013.
"Turning Waste Heat Into Clean Power; GNP's Expander System", Great Northern Power Corporation, 2022.
Ng et al., "Thermo-Economic Performance of an Organic Rankine Cycle System Recovering Waste Heat Onboard an Offshore Service Vessel", Journal of Marine Science and Engineering, May 14, 2020.
"First Flare Elimination Demonstration", ElectraTherm, 2022.
International Search Report and Written Opinion for PCT/US2022/071472, May 9, 2022.
International Search Report and Written Opinion for PCT/US2022/071475, May 17, 2022.
International Search Report and Written Opinion for PCT/US2022/071474, Jun. 10, 2022.
International Search Report and Written Opinion for PCT/US2022/071486, Jun. 14, 2022.
International Search Report and Written Opinion for PCT/US2022/071323, Jun. 28, 2022.
International Search Report and Written Opinion for PCT/US2022/071325, Jun. 28, 2022.
Invitation to Pay Additional Fees and Communication Relating to Results of Partial International Search for PCT/US2022/071329, mailed Jun. 27, 2022.
Invitation to Pay Additional Fees and Communication Relating to Results of Partial International Search for PCT/US2022/071327, mailed Jul. 4, 2022.
International Search Report and Written Opinion for PCT/US2022/071313, Jul. 5, 2022.
International Search Report and Written Opinion for PCT/US2022/071517, Jun. 27, 2022.
International Search Report and Written Opinion for PCT/US2022/071484, Jun. 27, 2022.
International Search Report and Written Opinion for PCT/US2022/071319, Jul. 12, 2022.
International Search Report and Written Opinion for PCT/US2022/071327, Aug. 29, 2022.
International Search Report and Written Opinion for PCT/US2022/071328, Sep. 9, 2022.
International Search Report and Written Opinion for PCT/US2022/071329, Aug. 25, 2022.

\* cited by examiner

POWER GENERATION ASSEMBLIES FOR HYDRAULIC FRACTURING SYSTEMS AND METHODS

CROSS REFERENCE TO RELATED APPLICATIONS

This application claims priority to, and the benefit of U.S. Provisional Application No. 63/480,197, filed Jan. 17, 2023, titled "POWER GENERATION ASSEMBLIES FOR HYDRAULIC FRACTURING SYSTEMS," and U.S. Provisional Application No. 63/477,571, filed Dec. 29, 2022, titled "POWER GENERATION ASSEMBLIES FOR HYDRAULIC FRACTURING SYSTEMS," the disclosures of which are incorporated herein by reference in their entireties.

BACKGROUND

This disclosure generally relates to systems and methods for electrical power generation. More particularly, this disclosure relates to systems and methods for generating electrical power within a hydraulic fracturing system.

Hydraulic fracturing is an oilfield operation that enhances hydrocarbon production (e.g., oil, natural gas, etc.) by increasing the permeability of a subterranean formation. Specifically, during a hydraulic fracturing operation, fracturing fluid is injected at high pressures into the subterranean formation to create new fractures and/or open existing fractures therein. The fractures provide flow paths for hydrocarbons to escape the subterranean formation and flow to the surface via a wellbore. Proppants may be mixed into the fracturing fluid so that the proppants may flow into the fractures to prevent them from closing after the hydraulic fracturing operation has ended Hydraulic fracturing operations utilize large industrial equipment, such as compressors, pumps, blenders, etc., as well as additional auxiliary components and systems including motors, control centers, lighting, sensors, etc. Many of these components use large amounts of power (e.g., electrical power). In addition, hydraulic fracturing operations are conducted at the wellsite, which may sometimes be remotely located from power distribution infrastructure, such as an electrical power grid. Even if an electrical power grid is accessible, the electrical power needs for a hydraulic fracturing operation may exceed the available supply of electricity.

BRIEF SUMMARY

Some embodiments disclosed herein provide systems and methods for locally generating electrical power for a hydraulic fracturing operation that may utilize one or more fluids of the hydraulic fracturing operation. For instance, some embodiments are directed to a power generation assembly, which may circulate a fracturing fluid of a hydraulic fracturing assembly to cool the working fluid so as to avoid use of large heat exchange devices that dissipate thermal energy to the surrounding environment. In addition, in some embodiments, a power generation assembly may utilize heat generated by one or more heat-generating components of the hydraulic fracturing assembly to heat the working fluid to avoid the need for additional heat sources within the power generation assembly. Thus, through use of the embodiments disclosed herein, a power generation assembly may be more effectively integrated within a hydraulic fracturing system, such that the efficiency of the power generation assembly and the hydraulic fracturing system may be increased.

Some embodiments disclosed herein are directed to a system including a hydraulic fracturing assembly configured to inject a fracturing fluid into a subterranean formation, the hydraulic fracturing assembly including a fracturing fluid reservoir. In addition, the system includes a power generation assembly. The power generation assembly includes an electrical generator and a working fluid circuit connected to the electrical generator such that circulation of a working fluid along the working fluid circuit actuates the electrical generator to generate electrical power. In addition, the power generation assembly includes a condenser connected along the working fluid circuit, the condenser fluidly connected to the fracturing fluid reservoir such that heat is transferred from the working fluid to the fracturing fluid within the condenser.

Some embodiments disclosed herein are directed to a method including (a) transferring heat from a hydraulic fracturing assembly to a working fluid of a power generation assembly, the hydraulic fracturing assembly to inject a fracturing fluid into a subterranean formation. In addition, the method includes (b) circulating the working fluid in a working fluid circuit within the power generation assembly to generate electrical power. Further, the method includes (c) transferring heat from the working fluid to the fracturing fluid.

Some embodiments disclosed herein are directed to a system including a hydraulic fracturing assembly configured to inject a fracturing fluid into a subterranean formation. In addition, the system includes a power generation assembly. The power generation assembly includes an electrical generator and a working fluid circuit connected to the electrical generator such that circulation of a working fluid along the working fluid circuit actuates the electrical generator to generate electrical power. In addition, the power generation assembly includes a condenser connected along the working fluid circuit, the condenser fluidly connected to the hydraulic fracturing assembly such that heat is transferred from the working fluid to the fracturing fluid within the condenser. Further, the power generation assembly includes a controller communicatively connected the power generation assembly. The controller is configured to receive an indication of a temperature of the fracturing fluid and shut down operation of the power generation assembly based on the indication of the temperature.

Some embodiments disclosed herein are directed to a method including (a) receiving an indication of a temperature of a fracturing fluid that is circulating between a fracturing fluid reservoir of a hydraulic fracturing assembly and a condenser of a power generation assembly. In addition, the method includes (b) determining that the temperature of the fracturing fluid is greater than a threshold. Further, the method includes (c) shutting down at least one of an operation of the power generation assembly or a flow of the fracturing fluid to the condenser based on (b).

Some embodiments disclosed herein are directed to a system including a hydraulic fracturing assembly configured to inject a fracturing fluid into a subterranean formation. The hydraulic fracturing assembly includes one or more fracturing fluid reservoirs. In addition, the system includes a power generation assembly. The power generation assembly includes an evaporator connected along a working fluid circuit. The evaporator to heat a working fluid flowing within the working fluid circuit. In addition, the power generation assembly includes a condenser connected along the working fluid circuit. The condenser fluidly is connected to the one or more fracturing fluid reservoirs such that the condenser is configured to receive a flow of fracturing fluid from the one or more fracturing fluid reservoirs to cool the working fluid. Further, the power generation assembly includes an expander connected along the working fluid circuit between the evaporator and the condenser. The expander is configured to expand the working fluid to actuate an electrical generator. Still further, the power generation assembly includes a controller communicatively connected the power generation assembly. The controller is configured to receive an indication that the hydraulic fracturing assembly is idle. In addition, the controller is configured to shut down at least one of an operation of the power generation assembly or a flow of the fracturing fluid to the condenser based on the indication that the hydraulic fracturing assembly is idle.

Some embodiments disclosed herein are directed to a system including a hydraulic fracturing assembly configured to inject a fracturing fluid stored in one or more fracturing fluid reservoirs into a subterranean formation. In addition, the system includes a power generation assembly. The power generation assembly includes a working fluid circuit and an evaporator positioned along the working fluid circuit. The evaporator is configured to heat a working fluid flowing within the working fluid circuit by use of a heated fluid from the hydraulic fracturing assembly. In addition, the power generation assembly includes a condenser positioned along the working fluid circuit. The condenser is configured to cool the working fluid by use of the fracturing fluid from the one or more fracturing fluid reservoirs. Further, the power generation assembly includes an expander positioned along the working fluid circuit, between the evaporator and the condenser. The expander is connected to an electrical generator and configured to expand the working fluid to generate electrical power.

Some embodiments disclosed herein are directed to a method including (a) receiving an indication of a temperature of a fracturing fluid that is circulating between a fracturing fluid reservoir of a hydraulic fracturing assembly and a condenser of a power generation assembly. In addition, the method includes (b) determining that the temperature of the fracturing fluid is greater than a threshold. Further, the method includes (c) outputting an alert based on (b).

Embodiments described herein comprise a combination of features and characteristics intended to address various shortcomings associated with certain devices, systems, and methods. The foregoing has outlined rather broadly the features and technical characteristics of some of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which.

DETAILED DESCRIPTION

Figure 1:
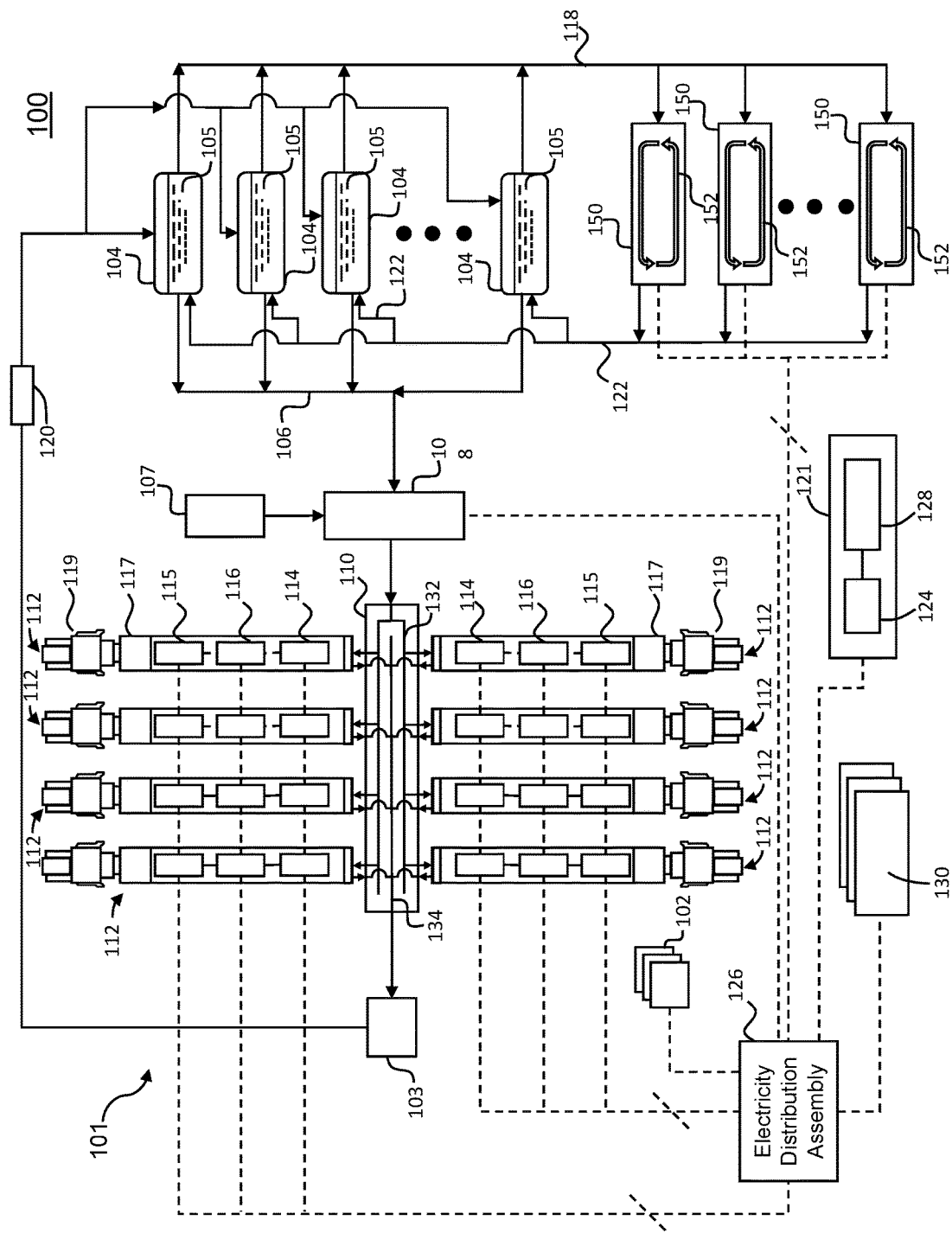
FIG. 1 is a schematic diagram of a system for conducting a hydraulic fracturing operation and including one or more power generation assemblies for locally generating electrical power according to some embodiments of the disclosure.

As previously described, a hydraulic fracturing system may utilize a large amount of electrical power during operations. In addition, a power distribution infrastructure, such as an electrical power grid, may not be suitable for supplying the electrical power needs of the hydraulic fracturing system either because the power infrastructure is inaccessible (e.g., due to the remote location of the wellsite) or is insufficient. Thus, an operator may desire to generate electrical power locally at the wellsite by use of a suitable power generation assembly.

Electrical power may be locally generated at a wellsite site via an electrical generator driven by an internal combustion engine. The internal combustion engine may comprise, for instance, a gas-fired turbine, a diesel engine, reciprocating engines (e.g., natural gas reciprocating engines), or any other suitable prime mover that relies on the combustion of fuel (e.g., hydrocarbons or combustible gases) to actuate the electrical generator. While effective, these systems may generate large amounts of waste heat, sometimes merely converting approximately 40% of the fuel's available heat content (e.g., which may be measured in British Thermal Units or BTUs) into mechanical energy to drive the electrical generator.

Accordingly, some embodiments disclosed herein provide systems and methods for locally generating electrical power for a hydraulic fracturing operation that may harvest or harness waste heat generated by one or more components or assemblies (e.g., prime movers, pumps, compressors, etc.) of a hydraulic fracturing system. For instance, some embodiments may include a power generation assembly that circulates a working fluid (e.g., water, steam, a refrigerant, etc.) to actuate an electrical generator. Waste heat generated by a prime mover or other heat-generating component or assembly of the hydraulic fracturing system may be utilized to heat the working fluid and thereby drive the actuation of the electrical generator during operations. Thus, this otherwise wasted heat energy may be converted (at least partially) into electrical power that may be used to operate the hydraulic fracturing system or may be routed to other systems (e.g., at the wellsite) or infrastructure (e.g., a battery bank, electrical power grid, etc.). Moreover, utilizing this otherwise wasted heat to generate electrical power may not result in additional emissions which may therefore help to maintain a lower carbon footprint for the hydraulic fracturing operation.

In some embodiments, the working fluid may be heated and cooled and may even change phase (e.g., between liquid and gas) one or more times as it is circulated within the power generation assembly. Heat exchange devices (e.g., heat exchangers such as shell-and-tube heat exchangers, fin-fan coolers, plate and frame heat exchangers, etc.) may be utilized to transfer heat to and from the working fluid. However, operation of these heat exchange devices may require additional fluids and energy that decrease the overall efficiency of the power generation assembly. Moreover, for purposes of cooling the working fluid, heat exchange devices such as fin fan coolers or other similar devices, may transfer the heat of the working fluid to the ambient environment (e.g., the air) as will be understood by those skilled in the art. However, such ambient-style heat exchange devices often occupy a large area (e.g., in order to increase the available surface area for heat exchange) and therefore, greatly increase the footprint of the power generation assembly overall, which may be problematic at a hydraulic fracturing site or wellsite where space is often limited. In addition, a large bank or array of fin-fan coolers may be difficult to transport, such that mobilization thereof with the rest of the hydraulic fracturing system may also be difficult or even unfeasible.

Thus, some embodiments of the systems and methods disclosed herein may utilize one or more fluids of the hydraulic fracturing system to support the operation of the power generation assembly while minimizing a size and complexity of the power generation assembly. For instance, a power generation assembly according to some embodiments may circulate the fracturing fluid of the hydraulic fracturing system to cool the working fluid so as to avoid use of large heat exchange devices, such as fin-fan coolers, within the power generation assembly. Thus, through use of the embodiments disclosed herein, a power generation assembly may be more effectively integrated within a hydraulic fracturing system, such that the efficiency of the power generation assembly and the hydraulic fracturing system may be increased.

FIG. 1 is a schematic diagram of a system 100 for conducting a hydraulic fracturing operation and includes one or more (e.g., a plurality of) power generation assemblies 150 for locally generating electrical power is shown according to some embodiments. System 100 includes a hydraulic fracturing assembly 101 that may perform a hydraulic fracturing operation by injecting a fracturing fluid 105 into a wellbore 103 (or a plurality of wellbores) to fracture a subterranean formation (not shown) as previously described and as will be understood by those skilled in the art. In addition, during operations the one or more power generation assemblies 150 may exchange heat with one or more fluids of the hydraulic fracturing assembly 101 to locally generate electrical power. In some embodiments, the power generation assemblies 150 (or each of the power generation assemblies 150) may generate up to about 8 megawatts (MW) during operations. Further details of the system 100 are provided below.

The hydraulic fracturing assembly 101, as will be understood by those skilled in the art, may include a plurality of storage vessels 104, a blender 108, a plurality of fracturing or pressurization units 112, and a manifold assembly 110. The plurality of storage vessels 104 may contain the fracturing fluid 105 therein, and thus may be referred to herein as "fracturing fluid reservoirs". The fracturing fluid 105 may include any suitable liquid or semi-liquid that may be used to create or open fractures within a subterranean formation as previously described above. In some embodiments, the fracturing fluid 105 may comprise water or water-based fluids; however, other fluids are contemplated such as, for instance, oils, foams, gels, surfactants, etc.

The plurality of storage vessels 104 may comprise any suitable reservoir that may hold a volume of fracturing fluid 105 therein. In some embodiments, the storage vessels 104 may include rigid above-ground storage tanks, but other reservoirs are contemplated, such as, for instance bladders, manifolds, open pits, etc. In some embodiments, hydraulic fracturing assembly 101 may include a single storage vessel 104. In some embodiments, the storage vessels 104 may include one or more mobile storage vessels that may be pulled by a tractor trailer or other suitable vehicle.

The plurality of storage tanks 104 may output the fracturing fluid 105 to blender 108 via piping 106. As used herein, the terms "piping," "pipes," "pipeline," and the like, refer to any suitable closed conduit or container which allows fluid to flow therethrough, such as, for instance, pipes, hoses, tubes, vessels, manifolds, or some combination thereof. The blender 108 may mix proppant into the fracturing fluid 105. The proppant may comprise sand and/or other fines or particles. During operations, blender 108 may receive and combine the fracturing fluid 105 from the plurality of storage vessels 104 and any applicable proppants from a proppant source 107 (e.g., one or more tanks or other containers) thereby producing a slurry. In some embodiments, the blender 108 may also receive and combine one or more chemical additives into the slurry. Once combined, the slurry may be discharged from the blender 108 to the manifold assembly 110.

The manifold assembly 110 may include one or more low pressure or inlet manifolds 132 and one or more high pressure or outlet manifolds 134 (which are sometimes referred to as "missiles"). In the embodiment depicted in FIG. 1, the manifold assembly 110 includes a pair of inlet manifolds 132 and a single output manifold 134; however, other numbers, combinations, and arrangements of manifolds 132, 134 are contemplated. The inlet manifolds 132 may receive the slurry from blender 108 and distribute the slurry to the plurality of pressurization units 112.

Each of the plurality of pressurization units 112 may include a hydraulic fracturing pump 114 (or more simply "pump 114") driven by a prime mover 116. The pump 114 may include any suitable pumping device or assembly, such as, for instance, a positive displacement pump or centrifugal pump. The prime mover 116 may include any suitable device or assembly for driving or actuating the pump 114 during operations. For instance, in some embodiments, the prime mover 116 may include an internal combustion engine (e.g., a diesel engine, gasoline engine, a gas-fired turbine, etc.), an electric motor, or some combination thereof, as will be understood by those skilled in the art. During operations, within each of the plurality of pressurization units 112, the pump 114 may receive slurry from one of the inlet manifolds 132, pressurize the slurry, and output the pressurized slurry into the outlet manifold 134 of the manifold assembly 110. The outlet manifold 134 may then direct the pressurized slurry toward the wellbore 103 (or a plurality of wellbores in some embodiments).

In addition, in some embodiments, each of the plurality of pressurization units 112 may include other auxiliary components 115 that support the operation of the prime mover 116 and/or the pump 114. For instance, in some embodiments, the auxiliary components 115 may include additional motors (e.g., electric motors, hydraulic motors, etc.), sensors, controllers (e.g., including one or more processors), pumps, compressors, heat exchangers, etc. that provide ancillary functionalities (e.g., heat exchange, operational control, etc.) which, in turn, support the overall operation of the prime mover 116 and the pump 114.

In the embodiment shown in FIG. 1, each of the plurality of pressurization units 112 may be configured to be portable, so that the pressurization units 112 may be transported to a well-site for assembly and operation for a period of time until completion of hydraulic fracturing operations or until maintenance and/or repair of the pressurization units 112 is necessary. Specifically, as shown in FIG. 1, the pressurization units 112 may be transported on a mobile platform 117, such as a chassis, via a truck 119 or other suitable vehicle.

During the hydraulic fracturing operations (and for a time after the cessation thereof), fluid may be expelled from the wellbore 103. The expelled fluid (otherwise known as "flowback") may include slurry (or some component(s) thereof) and potentially fluids and solids that originated from within the wellbore 103 of the subterranean formation. The expelled fluid may be routed to a separator 120 which may separate the fracturing fluid 105 from other constituents, as will be understood by those skilled in the art. In some embodiments, the separator 120 may include one or more separation or filtering devices or components that may remove solids or fluid contaminants or additives (e.g., proppants) from the fracturing fluid 105. Proppants that are separated out of the expelled fluid may be routed back to the blender 108 and/or the proppant source 107. Downstream of the separator 120, the fracturing fluid 105 may be routed back to the plurality of storage vessels 104.

As shown in FIG. 1, the hydraulic fracturing assembly 101 may include one or more additional support assemblies, systems, or components 102 (collectively "components 102") that may support and facilitate the hydraulic fracturing operation. For instance, the components 102 may include (among other features), controllers and control systems, sensors, lighting, and additional mechanical components (e.g., pumps, motors, compressors, blowers, etc.), among others.

System 100 may include fuel-powered electrical generator assembly 121 (or more simply "electrical generator assembly 121") that includes an electrical generator 124 actuated by a prime mover 128. Prime mover 128 may be an internal combustion engine, such as for instance a gas-fired turbine, a reciprocating engine (e.g., natural gas reciprocating engine), a diesel engine, etc. The electrical generator assembly 121 may generate electrical power that is distributed to one or more components of system 100 (e.g., hydraulic fracturing assembly 101) via an electricity distribution assembly 126 (or more simply "distribution assembly 126").

The distribution assembly 126 may comprise any one or combination of suitable electrical distribution components, such as, for instance, wires or transmission lines, busses, harnesses, transformers, traces, capacitors, inverters, switches, etc., as will be understood by those skilled in the art. The distribution assembly 126 may route (e.g., selectively route) the electrical power from a source (e.g., the electrical generator assembly 121, the one or more power generation assemblies 150, etc.) to one or more components or assemblies within the system 100 (e.g., pressurization units 112, components 102, blender 108, electrical generator assembly 121, power generation assemblies 150, etc.).

In addition (or alternatively), in some embodiments, the distribution assembly 126 may route electrical power to one or more other components or systems 130, such as, for instance, a local power grid, a battery (or battery bank), etc. In some embodiments, electrical power generated by the power generation assemblies 150 may be used within the power generation assemblies 150 themselves (or within other components, systems, or devices that support the power generation assemblies 150).

Figure 2:
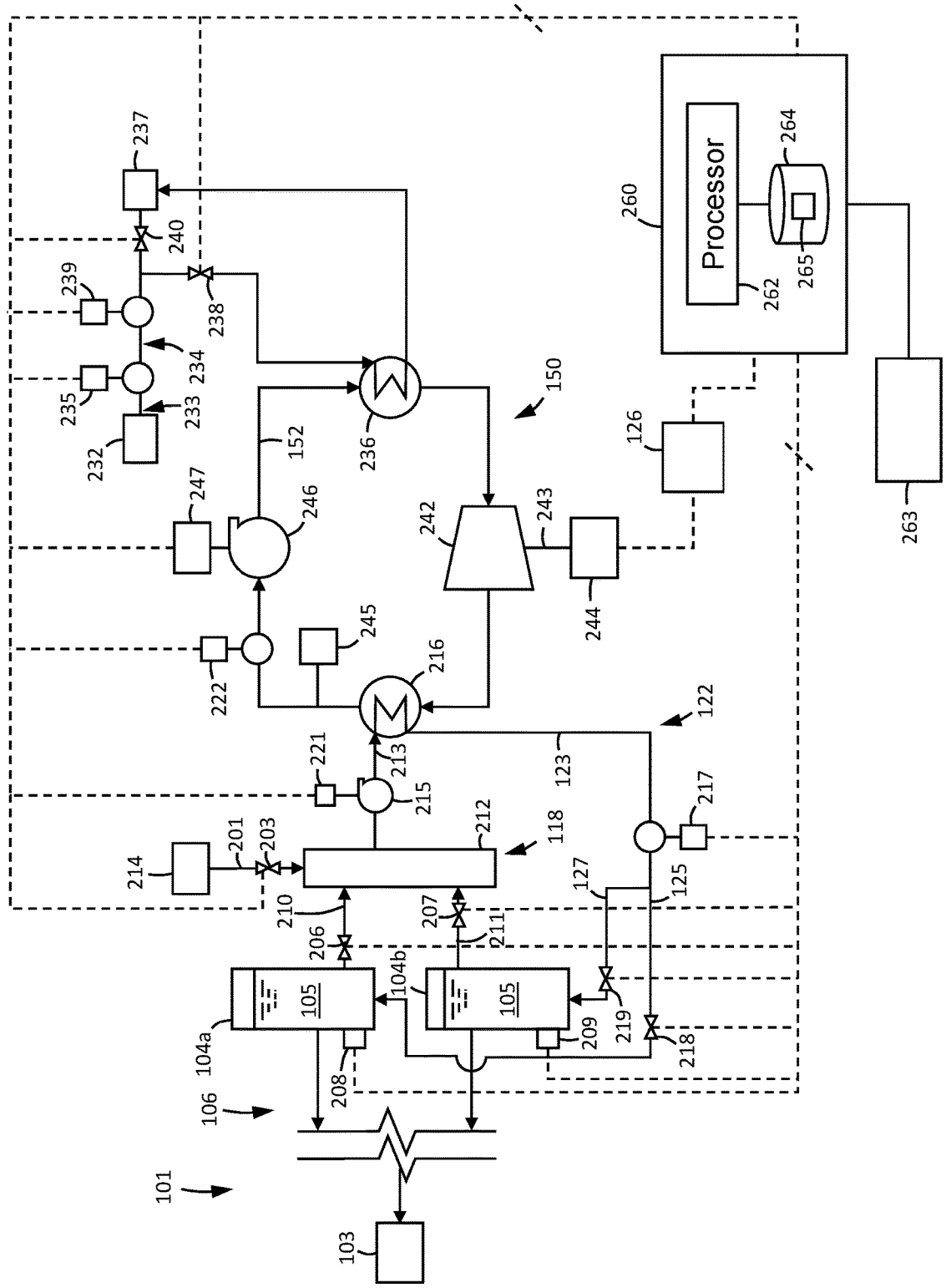
FIG. 2 is a schematic diagram of a power generation assembly of the system of FIG. 1 according to some embodiments of the disclosure.

As previously described, each power generation assembly 150 may be configured to generate electrical power that may then be routed to the electricity distribution assembly 126 (see e.g., FIGS. 1-2).

Each power generation assembly 150 may circulate a working fluid within a working fluid circuit 152 to generate electrical power. For instance, in some embodiments, each power generation assembly 150 may include or define a Rankine cycle, as will be understood by those skilled in the art, which includes the working fluid circuit 152 to generate electrical power (e.g., via an electrical generator). In some embodiments, the working fluid circulated within the working fluid circuit 152 may comprise an inorganic fluid such as water, carbon dioxide ($CO_2$) (e.g., supercritical $CO_2$), or ammonia. For instance, in some embodiments, the working fluid circulated within the working fluid circuit 152 may be water and the corresponding power generation assembly 150 may be a steam turbine power generation system. However, in other embodiments, the working fluid circulated within the working fluid circuit 152 may be or include an organic fluid, such as a hydrocarbon (e.g., propane, propylene, isobutane, etc.) or a refrigerant (e.g., a hydrofluorocarbon such as pentafluoropropane (R245a) or others). In embodiments in which an organic working fluid is used, the Rankine cycle defined within the power generation assemblies 150 may be referred to as an organic Rankine cycle (ORC).

In some embodiments, other power generating cycles or processes may be defined within one or more of the power generation assemblies 150 (either in addition to or in lieu of the Rankine cycles previously described above). For instance, in some embodiments, one or more of the power generation assemblies 150 may include or define, among others, a Kalina cycle, a Brayton cycle, a trilateral flash cycle (TFC), or some combination thereof.

During operations, within each power generation assembly 150, the working fluid may be subjected to selective heating and cooling as it is circulated along the working fluid circuit 152 to facilitate energy transfer from the working fluid to one or more electricity generating components (e.g., an electrical generator—not shown in FIG. 1 but described in more detail below). Specifically, the working fluid may be heated using a suitable heat source. In some embodiments, the heating of the working fluid may cause the working fluid to change phase from a liquid to a gas or vapor (or a super-critical state). The heated, vaporized working fluid is then expanded through a suitable expander (e.g., a turbine) which in-turn actuates the one or more electricity generating components to generate electrical power. The expanded working fluid may then be further cooled and condensed back to a liquid so that it may then be recycled back to the heat source via the working fluid circuit 152.

In some embodiments, the heat source for each power generation assembly 150 may include any suitable heat source to heat the working fluid during operations. For instance, as will be described in more detail below, in some embodiments one or more of the power generation assemblies 150 may utilize heat generated by one or more components, assemblies, and/or fluids of the hydraulic fracturing assembly 101 to heat the working fluid during operations. For instance, in some embodiments, one or more of the power generation assemblies 150 may utilize heat (e.g., via heated exhaust) generated by one or more prime movers of the hydraulic fracturing assembly 101 (e.g., one or more of the prime movers 116 of the pressurization units 112, prime mover 128 of electrical generator assembly 121, etc.) to heat the working fluid during operations. In some embodiments, one or more of the power generation assemblies 150 may utilize heat from a geothermal heat source (e.g., via the wellbore 103 or another wellbore or assembly that may harness the heat of the Earth). In some embodiments, one or more of the power generation assemblies 150 may utilize an internal heat source, such as a boiler, engine, etc. that is positioned within the corresponding power generation assembly(ies) 150.

In some embodiments, the power generation assemblies 150 may utilize the fracturing fluid 105 stored in the plurality of storage vessels 104 to cool the working fluid as it flows along the working fluid circuit 152 (e.g., such as after the working fluid has been routed through an expander to actuate an electrical generator as previously described). For instance, without being limited to this or any other theory, cooling the working fluid may allow the working fluid to completely (or substantially) condense to a liquid to facilitate further recirculation of the working fluid within the working fluid circuit 152. Specifically, during operations, fracturing fluid 105 may be routed from the plurality of storage vessels 104 to the plurality of power generation assemblies 150 via inlet piping 118. Within each power generation assembly 150 (e.g., within one or more heat exchangers of the power generation assembly 150), heat may be transferred from the working fluid to the fracturing fluid 105 such that the temperature of the working fluid is reduced while the temperature of the fracturing fluid 105 is increased. Thereafter, the heated fracturing fluid 105 is emitted from the power generation assembly 150 and flowed back to the plurality of storage vessels 104 via outlet piping 122. The heat transferred to the fracturing fluid 105 may then be dispersed within the hydraulic fracturing assembly 101, wellbore 103 and ultimately the surrounding environment (including the atmosphere and Earth) as a result of the circulation of the fracturing fluid 105 within the hydraulic fracturing assembly 101 as previously described. In some embodiments, each power generation assembly 150 may circulate about 120 barrels per minute of fracturing fluid 105 to cool the working fluid flowing within working fluid circuit 152 during operation.

During this process, it should be noted that while heat is transferred from the working fluid to the fracturing fluid 105, the working fluid and fracturing fluid 105 may be prevented from physically contacting or mixing. Thus, the working fluid and fracturing fluid 105 may be contained and circulated as separate and distinct fluids during operations.

Therefore, the one or more power generation assemblies 150 may utilize the fracturing fluid 105 as a heat sink to transfer heat from the working fluid and, thus, facilitate and support the operation of the power generation assemblies 150. In this way, additional heat exchange fluids and/or large heat exchange components for transferring the heat of the working fluid to the ambient environment (e.g., fin fan coolers, as will be understood by those skilled in the art) may be avoided. Accordingly, by use of the fracturing fluid 105 as a cooling medium for the working fluid, the power generation assemblies 150 may be more efficiently and seamlessly integrated with the hydraulic fracturing assembly 101.

As shown in FIG. 2, one of the power generation assemblies 150 of system 100 is shown according to some embodiments. The embodiment of power generation assembly 150 shown in FIG. 2 may be representative of one or more of the power generation assemblies 150 of system 100 or all of the power generation assemblies 150 of system 100. In addition, to facilitate the description of the embodiment of power generation assembly 150 shown in FIG. 2, some of the features of hydraulic fracturing assembly 101 (e.g., one or more of the storage vessels 104, wellbore 103, etc.) are depicted in FIG. 2, and reference may be made to other features and components of system 100 shown in FIG. 1. As such, in the following description, like reference numerals are used herein to identify features of system 100 that were previously described above and depicted in FIG. 1.

Power generation assembly 150 includes a first heat exchanger 236, a second heat exchanger 216, a pump 246, and an expander 242 all fluidly connected along, e.g., within, the working fluid circuit 152, as will be understood by those skilled in the art. The expander 242 may include suitable device that controllably expands a fluid to convert the pressure of the fluid into mechanical work. In some embodiments, the expander 242 may include a turbine expander, positive displacement expander, scroll expander, screw expander, twin-screw expander, vane expander, piston expander, or other volumetric expander. The expander 242 is mechanically connected to an electrical generator 244 via a linkage 243 which may include a shaft (thus, linkage 243 may be referred to herein as "shaft" 243). The electrical generator 244 may generate electrical power when actuated (e.g., by expander 242), and the electrical power generated by the electrical generator 244 may be provided to one or more components of system 100 or outside of system 100 via distribution assembly 126 as previously described (e.g., pressurization units 112, components 102, blender 108, electrical generator assembly 121, power generation assemblies 150, the one or more other components or systems 130, etc.) (FIG. 1).

The first heat exchanger 236 and the second heat exchanger 216 may each include a suitable device or assembly that exchanges heat between two fluids. For instance, the first heat exchanger 236 and the second heat exchanger 216 may each define two fluidic paths, one for a heated fluid and one for a cool fluid. The fluidic paths may be loops, coils, densely packed piping, tubes, chambers, some other type of path to allow for fluid to flow therethrough, and/or a combination thereof, as will be understood by those skilled in the art. As fluids flow through the heat exchanger, the cool fluid's temperature may increase, while the heated fluid's temperature may decrease. For instance, as will be described in more detail below, the first heat exchanger 236 may receive a flow of heated fluid (e.g., heated exhaust) from a heat-generating component 232 of the hydraulic fracturing assembly 101 (or some other heat source within or outside of hydraulic fracturing assembly 101) to heat the working fluid of the power generation assembly 150, and the second heat exchanger 216 may receive a flow of fracturing fluid 105 from the hydraulic fracturing assembly 101 to cool the working fluid of the power generation assembly 150. The first heat exchanger 236 is positioned upstream of the expander 242 and the second heat exchanger 216 is positioned downstream of the expander 242 along the working fluid circuit 152.

In particular, during operations the first heat exchanger 236 may heat the working fluid so that the working fluid changes phase (or substantially changes phase) from a liquid to a vapor. Thereafter, the vaporized (or partially vaporized) working fluid flows along the working fluid circuit 152 to the expander 242, which controllably expands the heated working fluid to rotate the shaft 243 which, in turn, actuates the electrical generator 244 to generate electrical power as previously described. After exiting the expander 242, the working fluid flows along working fluid circuit 152 to the second heat exchanger 216, wherein the heated working fluid is cooled and condensed (or at least partially condensed) back to a liquid, thereby producing a condensed working fluid. The pump 246 may be positioned downstream of the second heat exchanger 216 and upstream of the first heat exchanger 236 along the working fluid circuit 152 such that the pump 246 may pressurize the condensed working fluid flowing out of the second heat exchanger 216, thereby producing a pressurized, condensed working fluid. The pump 246 may then emit the pressurized, condensed working fluid back to the first heat exchanger 236, via the working fluid circuit 152, to repeat the sequence described above. During these operations, working fluid may be selectively supplied to the working fluid circuit 152 via a working fluid reservoir 245 to replace any loses and, therefore, ensure continuous operation of the power generation assembly 150. The working fluid reservoir 245 may store the working fluid in a liquid state in some embodiments.

Because the first heat exchanger 236 may be used to heat and vaporize (or partially vaporize) the working fluid during operations, it may be referred to herein as an "evaporator" 236. Likewise, because the second heat exchanger 216 may be used to condense (or partially condense) the working fluid during operations, it may be referred to herein as a "condenser" 216. The evaporator 236 and condenser 216 may be or include any suitable heat exchange devices, as will be understood by those skilled in the art, which is configured to transfer heat between two fluids, such as, for instance, shell-and-tube heat exchangers, tube-and-tube heat exchangers, plate heat exchangers, etc.

Also, as shown in FIG. 2, in some embodiments, the evaporator 236 may transfer heat to the working fluid using heat generated within the hydraulic fracturing assembly 101 (or a component thereof) (FIG. 1). Specifically, in some embodiments, the evaporator 236 may transfer heat generated by a component 232 (referred to as a "heat-generating component" 232) of the hydraulic fracturing assembly 101 (FIG. 1). The heat-generating component 232 may be or include one or more prime movers, engines, motors, etc. of the hydraulic fracturing assembly 101, such as for instance, one or more of the prime movers 116, the prime mover 128, or some combination thereof. During operations, the heat-generating component 232 may generate and emit heated exhaust from an exhaust outlet 233. The heated exhaust is then transported via piping 234 to the evaporator 236 such that the evaporator 236 may then transfer heat from the heated exhaust to the working fluid (and thereby cause the working fluid to vaporize as previously described). After flowing through the evaporator 236, the exhaust may then be emitted to a destination 237, which may include the atmosphere or other processes or systems (e.g., another power generation assembly 150, an exhaust treatment system, etc.). Thus, the piping 234 fluidly connects the evaporator 236 to the exhaust outlet 233 of the heat generating component 232.

As previously described, the evaporator 236 may transfer heat to the working fluid from a heat source that is not derived from the hydraulic fracturing assembly 101. For instance, evaporator 236 may transfer heat to the working fluid from a heat source that is within the power generation assembly 150 or any other suitable heat source (e.g., a geothermal heat source).

The fracturing fluid 105 may be circulated between the plurality of storage vessels 104 and the power generation assembly 150 via inlet piping 118 and outlet piping 122 to cool the working fluid via the condenser 216 positioned along the working fluid circuit 152 (see, e.g., FIG. 2). Two of the storage vessels 104 are depicted in FIG. 2; however, it should be appreciated that the other storage vessels 104 (if more than two are included within system 100) may be fluidly connected to the power generation assembly 150 in a similar manner according to some embodiments. To simplify the description herein, the two storage vessels 104 depicted in FIG. 2 are identified as a "first storage vessel 104a" and a "second storage vessel 104b."

In the embodiment of FIG. 2, the inlet piping 118 includes an inlet manifold 212, a first pipe 210 connecting the first storage vessel 104a to the inlet manifold 212, a second pipe 211 connecting the second storage vessel 104b to the inlet manifold 212, and an injection pipe 213 connecting the inlet manifold 212 to the condenser 216 within the power generation assembly 150. The storage vessels 104 may be fluidly connected in parallel to the inlet manifold 212. Inlet manifold 212 may also be fluidly connected to an alternative fluid source 214 (e.g., an additional tank or vessel that is separate from the storage vessels 104, a natural water source such as a river, lake, stream, ocean, etc.) via piping 201. A pump 215 may be positioned along the injection pipe 213 between the manifold 212 and the condenser 216. In addition, in the embodiment of FIG. 2, the outlet piping 122 includes an outlet pipe 123 connected to condenser 216 that splits into a first outlet pipe 125 that is fluidly connected to the first storage vessel 104a and a second outlet pipe 127 that is fluidly connected to the second storage vessel 104b.

During operations, the pump 215 draws the fracturing fluid 105 into and through the inlet manifold 212 from the storage vessels 104a, 104b and then delivers the fracturing fluid 105, via the injection pipe 213, to the condenser 216 so that heat may be transferred from the working fluid to the fracturing fluid 105 as previously described above. Thereafter, the heated fracturing fluid 105 exits the condenser 216 and flows via outlet pipes 123, 125, 127 back to the storage vessels 104a, 104b. Simultaneously, as previously described above, the fracturing fluid 105 may also flow out of the storage vessels 104a, 104b and inject into wellbore 103 via the hydraulic fracturing assembly 101 as previously described above (FIG. 1). Thus, the heat that is transferred to the fracturing fluid 105 from the working fluid within the power generation assembly 150 may be further transferred to the hydraulic fracturing assembly 101, the wellbore 103 and subterranean formation during operations as previously described. In some embodiments, the inlet manifold 212 may communicate fracturing fluid 105 to the condensers 216 of a plurality of power generation assemblies 150 that are included within system 100 (FIG. 1).

As shown in FIG. 2, valves may be positioned throughout the piping 234 as well as the inlet piping 118 and outlet piping 122 so as to control the flow of fluids (e.g., heated exhaust, fracturing fluid 105, etc.) toward and away from the heat exchangers 216, 236 of the power generation assembly 150 during operations, as will be understood by those skilled in the art. For instance, within the inlet piping 118, a valve 206 is positioned along the first pipe 210 and a valve 207 is positioned along the second pipe 211. In addition, within the outlet piping 122, a valve 218 is positioned along the first outlet pipe 125, and a valve 219 is positioned along the second outlet pipe 127. Further, the piping 234 includes a pair of valves 238, 240 that may be actuated to selectively bypass the heated exhaust of the heat-generating component 232 around the evaporator 236 to the destination 237. Moreover, a valve 203 may be positioned along the piping 201 connecting the inlet manifold 212 to the alternative fluid source 214.

The valves 203, 206, 207, 218, 219, 238, 240 may include any suitable device or assembly for controlling the flow of a fluid along a pipe. For instance, the valves 203, 206, 207, 218, 219, 238, 240 may be actuated to selectively allow, prevent, or adjust a flow of fluid along a pipe. In some embodiments, the valves 203, 206, 207,218, 219, 238, 240 may include ball valves, needle valves, gate valves, shuttle valves, butterfly valves, or some combination thereof. The valves 203, 204, 207,218, 219, 238, 240 may also be actuatable by another component, such as a controller (e.g., controller 260 described in more detail below), to control (e.g., allow, prevent, or adjust) the flow of a fluid along a pipe during operations.

As also shown in FIG. 2, various sensors, as will be understood by those skilled in the art, may be utilized to monitor one or more parameters (e.g., pressure, temperature, flow rate, etc.) or values indicative thereof for the fluids (e.g., heated exhaust, fracturing fluid 105, etc.) that are flowed toward and away from the heat exchangers 216, 236 of the power generation assembly 150 during operations. For instance, temperature sensors 208, 209 may be utilized to monitor the temperature of the fracturing fluid 105 within the storage vessels 104a, 104b, respectively. The temperature sensors 208, 209 may be directly attached (or positioned within) the storage vessels 104a, 104b, respectively, or may be connected to storage vessels 104a, 140b, respectively, via piping. In addition, a temperature sensor 217 may be positioned on the outlet pipe 123 to monitor the temperature of the fracturing fluid 105 flowing out of the condenser 216 of the power generation assembly 150. Further, a temperature sensor 235 and flow rate sensor 239 may be positioned along the piping 234 to monitor the temperature and flow rate, respectively, of heated exhaust output by the heat-generating component 232.

In addition, a temperature sensor 222 is positioned along the working fluid circuit 152 to monitor the temperature of the working fluid during operations. In the embodiment shown in FIG. 2, the temperature sensor 222 is positioned downstream of the condenser 216 and upstream of the pump 246; however, the temperature sensor 222 may be placed at any point along the working fluid circuit 152.

The temperature sensors 208, 209, 217, 222, 235 may detect or determine temperature or a value indicative thereof. In some embodiments, the temperature sensors 208, 209, 217, 222, 235 may include thermocouples, thermistors, resistance temperature detects, semiconductor circuits, or some combination thereof. The flow rate sensor 239 may detect a volumetric flow rate and/or a mass flow rate, or a value indicative thereof. The flow rate sensor 239 may include any suitable flow sensor or meter such as, a differential pressure flowmeter, a velocity flow sensor, a positive displacement flow sensor, a mass flow sensor, or some combination thereof. Each of the sensors 208, 209, 217, 222, 235, 239 may produce a corresponding output that may be received and interpreted by another component, such as a controller (e.g., controller 260 described in more detail below) so as to allow one or more parameters of the fluids (e.g., heated exhaust, fracturing fluid 105, etc.) that are flowed toward and away from the heat exchangers 216, 236 of the power generation assembly 150 during operations.

Figure 3:
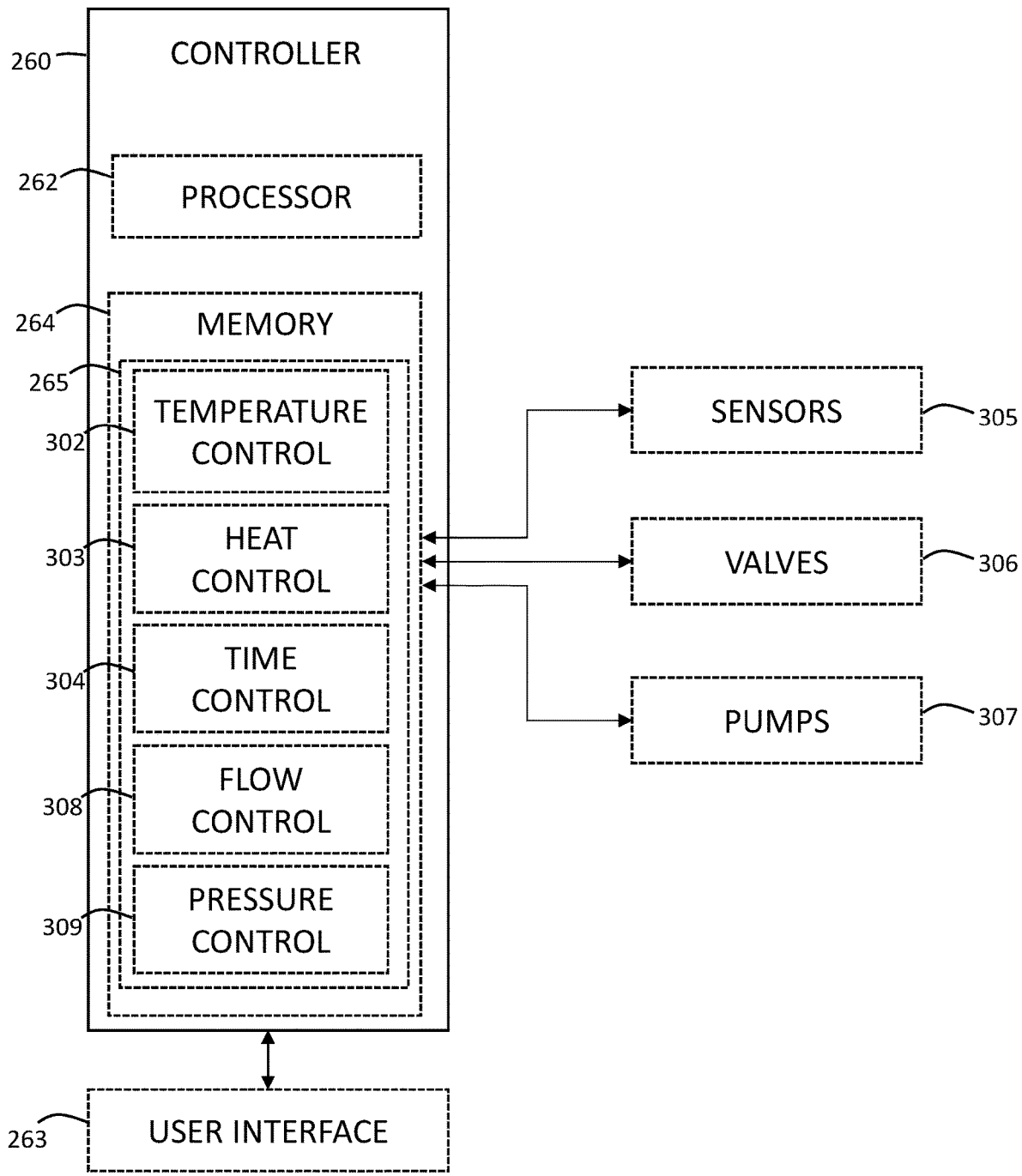
FIG. 3 is a schematic diagram of a controller for controlling one or more operational aspects or parameters of a power generation assembly according to some embodiments of the disclosure.

As shown in FIGS. 2 and 3, the system 100 (FIG. 1), hydraulic fracturing assembly 101, and/or one or more of the power generation assemblies 150 may include one or more controllers 260. In some embodiments, the controller 260 may be a central or master controller configured to control one or more operational aspects or parameters for the system 100 shown in FIG. 1 (including the hydraulic fracturing assembly 101 and the power generation assemblies 150) and/or to control other controllers, for example, like controllers associated with other equipment or devices, as will be understood by those skilled in the art. In some embodiments, the controller 260 may control one or more operational aspects or parameters of one or more of the power generation assemblies 150. The controller 260 may comprise a single controller or a plurality of controllers (or components thereof) that are communicatively connected to one another.

In the embodiment shown in FIG. 2, the controller 260 is configured to control one or more operational aspects or parameters of the power generation system 150 depicted therein. Thus, the controller 260 may be connected to various components of the power generation assembly 150 and hydraulic fracturing assembly 101 as shown (e.g., sensors 208, 209, 217, 222, 235, 239, valves 206, 207, 218, 219, and pumps 246, 215 shown in FIG. 3. Moreover, the controller 260 may also be connected to additional equipment and devices not shown.

Controller 260 may include a processor 262 and memory 264. The memory 264 may include machine-readable instructions 265 that are executable by the processor 262 to provide the processor 262 (and the controller 260 more broadly) with the functionality described herein.

The processor 262 may include, for example, one processor or multiple processors included in a single device or distributed across multiple devices. In general, processor 262 fetches, decodes, and executes instructions (e.g., instructions 265). In addition, processor 262 may also perform other actions, such as, making determinations, detecting conditions or values, etc., and communicating signals. If processor 262 assists another component in performing a function, then processor 262 may be said to cause the component to perform the function.

The processor 262 may be at least one of a central processing unit (CPU), a semiconductor-based microprocessor, a graphics processing unit (GPU), a field-programmable gate array (FPGA) to retrieve and execute instructions (e.g., instructions 265), a real time processor (RTP), other electronic circuitry suitable for the retrieval and execution of instructions (e.g., instructions 265) stored on a machine-readable storage medium (e.g., memory 264), or a combination thereof.

In some embodiments, the memory 264 may be a non-transitory machine-readable storage medium. As used herein, a "non-transitory machine-readable storage medium" may be any electronic, magnetic, optical, or other physical storage apparatus to contain or store information such as executable instructions (e.g., instructions 265), data, and the like. The memory 264 may be any machine-readable storage medium including volatile memory (e.g., random access memory (RAM)), non-volatile memory (read-only memory (ROM), resilient distributed datasets (RDD) memory, flash memory, etc.), a storage device (e.g., hard drive), a solid-state drive, any type of storage disc, and the like, or a combination thereof.

In addition, in some embodiments, the controller 260 may be communicatively connected (e.g. via wired and/or wireless connection) to a user interface 263 (e.g., a monitor, display, computing device, etc.) as shown in FIGS. 2 and 3. The user interface 263 may allow one to monitor the status and/or input thresholds (e.g., parameters) of one or more components of the power generation assembly 150 and/or the hydraulic fracturing assembly 101.

The controller 260 (see, e.g., FIGS. 2-3) may be configured to control one or more operational aspects or parameters of the power generation assembly 150. Specifically, in some embodiments, the controller 260 may be configured to control the operation of the power generation assembly 150 based on one or more parameters of the hydraulic fracturing assembly 101 and/or the power generation assembly 150.

Thus, the controller 260 may be communicatively connected (e.g., via wired and/or wireless connection) to one or more of the valves 203, 206, 207,218, 219, 238, 240 and to one or more of the sensors 208, 209, 217, 222, 235, 239. The one or more valves are schematically represented as "valves" 306 in FIG. 3, and the one or more sensors are schematically represented as "sensors" 305 in FIG. 3. Further, the controller 260 may also be communicatively connected (e.g., again via wired and/or wireless connection) to one or more pumps 246, 215, or more particular the motors or drivers 247, 221 of pumps 246, 215, respectively. In some embodiments, the controller 260 may adjust an operational speed of (and thus flow rate through) one or more of the pumps 246, 215. For instance, in some embodiments, the drivers 247, 221 may have a variable speed output (e.g., via a variable frequency drive or other suitable system or device) that may be adjusted by the controller 260 during operations to thereby affect the operational speed of the one or more pumps 246, 215. The one or more pumps 246, 215 are schematically represented as "pumps" 307 in FIG. 3.

As perhaps best shown in FIG. 3, the machine-readable instructions 265 may include a plurality of separate instructions 320, 303, 304, 308, 309 for controlling the one or more operational aspects or parameters of the power generation assembly 150 (FIG. 2). For instance, the machine-readable instructions 265, as will be understood by those skilled in the art, may include temperature control instructions 302, heat control instructions 303, and time control instructions 304. As will be described in more detail below, the temperature control instructions 302 may cause the processor 262 to control the operation of the power generation assembly 150 based on a temperature of one or more fluids associated with the power generation assembly 150 (e.g., the working fluid, the fracturing fluid 105, the heated exhaust, etc.). In addition, the heat control instructions 303 may cause the processor 262 to control the operation of the power generation assembly 150 based on one or more parameters of the heat source for the power generation assembly 150 (e.g., heated exhaust). Further, the time control instructions 304 may cause the processor 262 to control the operation of the power generation assembly 150 based on an amount of time that the hydraulic fracturing assembly 101 (FIGS. 1 and 2) has been idle.

Still further, the flow control instructions 308 may cause the processor 262 to adjust (e.g., raise, lower, etc.) a flow rate of one or more fluids associated with the power generation assembly 150 (e.g., the working fluid, the fracturing fluid 105, the heated exhaust, etc.). Also, the pressure control instructions 309 may cause the processor 262 to adjust (e.g., raise, lower, etc.) the pressure of one or more fluids associated with the power generation assembly 150 (e.g., the working fluid, the fracturing fluid 105, the heated exhaust, etc.). In particular, the flow control instructions 308 and pressure control instructions 309 may cause the processor 262 to adjust the flow rate and pressure, respectively, of the one or more fluids by actuating (e.g., opening or closing) one or more valves (e.g., valves 203, 206, 207,218, 219, 238, 240 shown in FIG. 2) and/or adjusting (e.g., raising or lowering) an operation speed or output of one or more pumps (e.g., pumps 215, 246 shown in FIG. 2) based on a variety of factors. For instance, the processor 262 may adjust the flow rate and pressure of the one or more fluids based on one or more parameters (e.g., pressures, temperatures, flow rates, etc.) of the fluids during operations to optimize the performance of the power generation assembly 150, to prevent operating outside of set parameters or ranges, etc.

FIGS. 4-7 illustrate embodiments of methods 400, 500, 600, 700 of operating a power generation assembly (e.g., power generation assembly 150) that circulates one or more fluids of a hydraulic fracturing assembly (e.g., hydraulic fracturing assembly 101) according to some embodiments. In some embodiments, methods 400, 500, 600, 700 may be performed using the system 100 of FIG. 1. In particular, in some embodiments, one or more features of methods 400, 500, 600, 700 may be performed using the controller 260 shown in FIGS. 2 and 3. As a result, methods 400, 500, 600, 700 may be representative of some of the machine-readable instructions 265 stored on memory 264 (FIGS. 2 and 3) in some embodiments. Specifically, the methods 400, 500, 600, 700 may be representative of the instructions 302, 303, 304 shown in FIG. 3 according to some embodiments.

In describing the features of methods 400, 500, 600, 700 continuing reference will be made to the systems and assemblies shown in FIGS. 1 and 2. However, it should be appreciated that methods 400, 500, 600, 700 may be practiced using different systems and assemblies, and thus, reference to the systems and assemblies of FIGS. 1 and 2 should not be interpreted as limiting all potential implementations of methods 400, 500, 600, 700. In some embodiments, methods 400, 500, 600, 700 may be repeated, performed in different orders, omitted, and/or performed in parallel with or a partially overlapping in time manner with each other or other methods.

Figure 4:
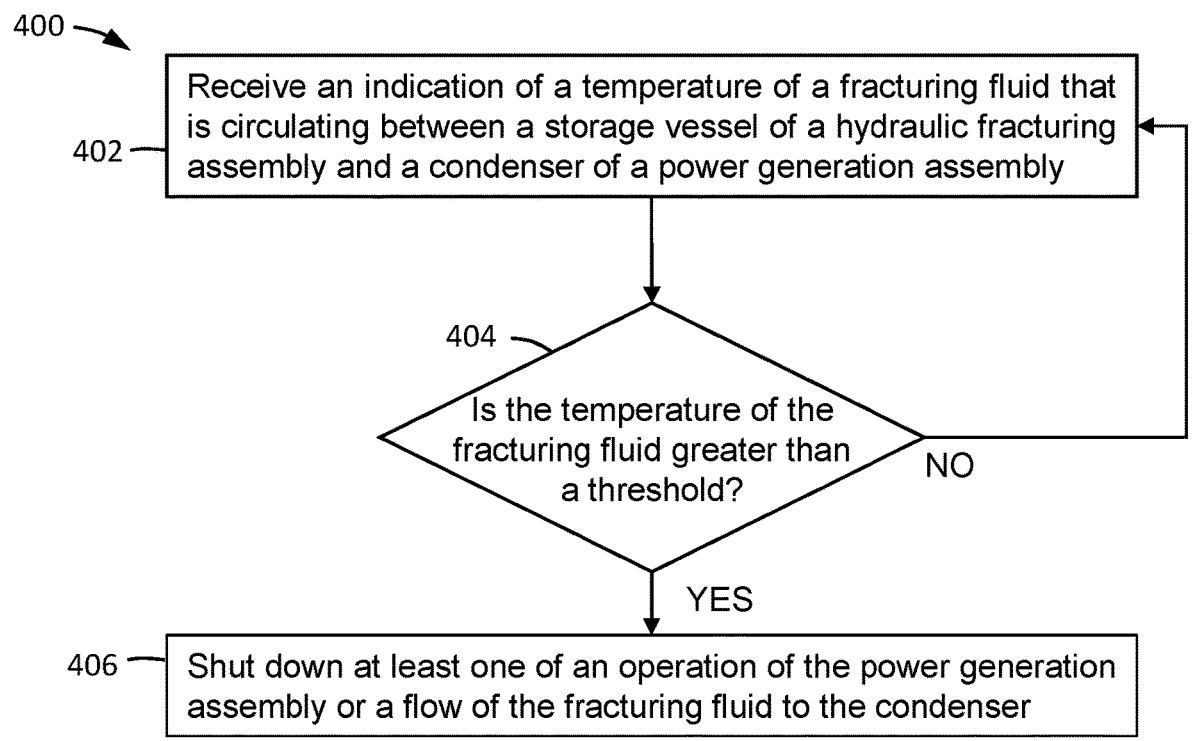
FIGS. 4-8 are diagrams of methods of operating a power generation assembly that circulates one or more fluids of a hydraulic fracturing assembly according to some embodiments of the disclosure.
Figure 5:
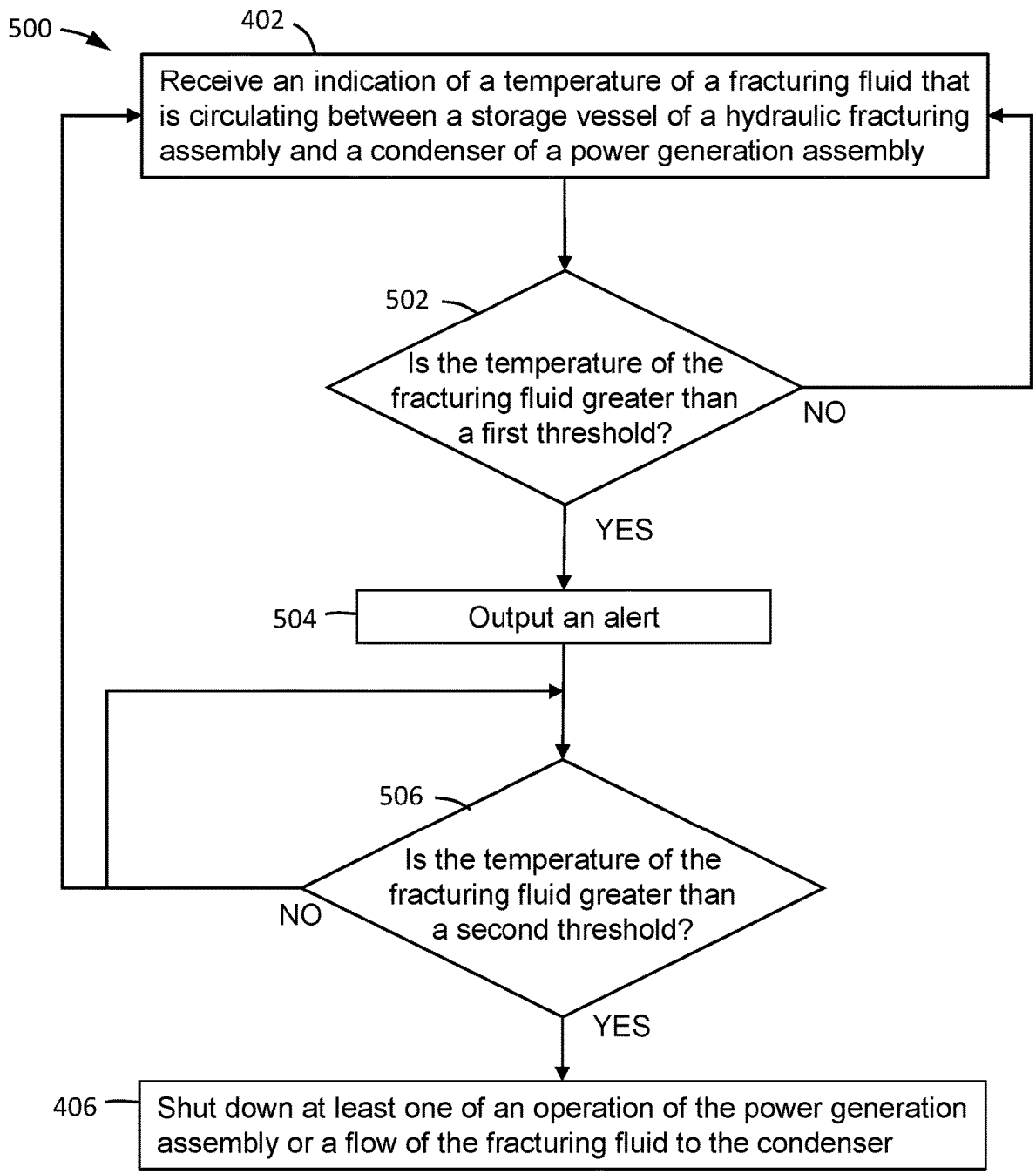

As shown in FIGS. 4 and 5, embodiments of methods 400 and 500, respectively, may be utilized to control the operation of a power generation assembly based on a temperature of a fracturing fluid that is circulated within the power generation assembly to cool a working fluid. In some embodiments, methods 400 and 500 may be representative of embodiments of the temperature control instructions 302 shown in FIG. 3. For instance, for the power generation assembly 150 and hydraulic fracturing assembly 101 shown in FIG. 2, in some embodiments the controller 260 may monitor one or more parameters of the power generation assembly 150 and hydraulic fracturing assembly 101 to determine if the temperature of the fracturing fluid 105 is above a threshold (or thresholds) that may indicate whether fracturing fluid 105 should be flowed to the condenser 216 to cool the working fluid as previously described. Without being limited to this or any other theory, if hydraulic fracturing assembly 101 is not operating to inject the fracturing fluid 105 into the wellbore 103, heat from the condenser 216 may build up within the fracturing fluid 105, including with the storage vessels 104a, 104b. At some point in time, the temperature of the fracturing fluid 105 may reach a level that it may no longer act as an effective heat sink for the working fluid flowing within the working fluid circuit 152. In addition, the temperature of the fracturing fluid 105 may rise above an operating temperature or threshold for the storage vessels 104a, 104b, inlet piping 118, outlet piping 122, piping 106, or other components of hydraulic fracturing assembly 101, system 100, or power generation assembly 150. In some circumstances, the amount of heat transferred to the fracturing fluid 105 may be such that the temperature of the fracturing fluid 105 rises above the threshold even if the hydraulic fracturing assembly 101 is operating. Thus, the controller 260 may monitor the temperature of the fracturing fluid 105 during operations.

Reference is now made to method 400 shown in FIG. 4. Method 400 may include receiving an indication of a temperature of a fracturing fluid that is circulating between a storage vessel of a hydraulic fracturing assembly and a condenser of a power generation assembly at block 402. For instance, during operation of the power generation assembly 150 shown in FIG. 2, controller 260 may monitor the temperature of the fracturing fluid 105 via one or more of the temperature sensors 208, 209, 217. As previously described, the sensors 208, 208, 217 may output a value of the temperature, or some value that is indicative thereof, to the controller 260. In some embodiments, block 402 may include receiving an indication of a temperature of the fracturing fluid within a particular component or portion of the assembly or system (e.g., such as at the storage vessels 104a, 104b in FIG. 2 via the temperature sensors 208, 209, respectively).

Method 400 also may include determining whether the temperature of the fracturing fluid is greater than a threshold at block 404. The threshold may be set based on an operating temperature range of one or more of the components that may hold or contain the fracturing fluid during operations. For instance, for the hydraulic fracturing assembly 101 and power generation assembly 150 shown in FIG. 2, the storage vessels 104a, 104b, piping 106, 118, 122 may all have designated operating temperature ranges based on a variety of factors (e.g., material, wall thickness, component placement relative to personnel, etc.). The operating temperature range for any one or more of these components may be used to derive the threshold of the temperature at block 404. In some embodiments, the temperature threshold of the fracturing fluid may be set to avoid breakdown of any chemicals and/or additives (e.g., friction reducers) that may be mixed within the fracturing fluid for hydraulic fracturing operations. For example, if chemicals or additives are not mixed in the fracturing fluid 105, the temperature threshold of the fracturing fluid 105 may be higher than for the case where chemicals or additives are mixed into the fracturing fluid. For instance, in some embodiments, the temperature threshold for the fracturing fluid 105 may be approximately 140° F. if no chemicals or additives are included therein but may be 120° F. if the fracturing fluid 105 includes one or more such chemicals or additives.

As show in FIG. 4, if it is determined that the temperature of the fracturing fluid is less than or equal to the threshold at block 404 (the determination at block 404 is "no"), method 400 may return to block 402 to once again receive an indication of the temperature of the fracturing fluid. If, on the other hand, it is determined that the temperature of the fracturing fluid is above the threshold at block 404 (the determination at block 404 is "yes"), method 400 may proceed to shut down at least one of an operation of the power generation assembly or a flow of the fracturing fluid to the condenser at block 406. Thus, block 406 may be performed in response to the determination that the temperature of the fracturing fluid is above the threshold at block 404.

In some embodiments, block 406 may include stopping or shutting down operation of the power generation assembly, the hydraulic fracturing assembly, and/or some select components thereof. For instance, with respect to the power generation assembly 150 and hydraulic fracturing assembly 101 shown in FIG. 2, if the controller 260 determines that one or more of the temperature sensors 208, 209, 217 detects a temperature of the fracturing fluid 105 that is above the threshold, then the controller 260 may take action to prevent the continued circulation of fracturing fluid 105 between the storage vessels 104a, 104b and the condenser 216. For instance, the controller 260 may close one or more of the valves 206, 207, 218, 219 and/or may shut down (or adjust a speed of) the pump 215 (or more particularly the driver or prime mover 221 of pump 215) to prevent additional heat from building within the fracturing fluid 105. In addition, once controller 260 determines that the temperature of the fracturing fluid 105 is above the threshold, the controller 260 may also shut down the operation of the power generation assembly 150 such as by shutting down pump 246 (or more particularly the driver or prime mover 247 of pump 246) to stop the flow of working fluid along the working fluid circuit 152 and/or shutting down the expander 242. Further, in the event that operation of the power generation assembly 150 is shut down by controller 260, controller 260 may also prevent the flow of heated exhaust from the heat-generating component 232 to the evaporator 236 by actuating valves 238, 240 (e.g., closing valve 238 and opening valve 240) to cause any heated exhaust to bypass the evaporator 236 and flow directly to the destination 237.

Further, in some embodiments, block 406 may include maintaining the operation of the power generation assembly, the hydraulic fracturing assembly, or both, and altering a flow path of one or more fluids therein. For instance, with respect to the power generation assembly 150 and hydraulic fracturing assembly 101 shown in FIG. 2, upon determining that the temperature of the fracturing fluid 105 is above a threshold, the controller 260 may open the valve 203 to allow the alternative fluid source 214 to supply fluid to the condenser 216 in lieu of or in combination with the fracturing fluid 105. In some embodiments, when the controller 260 opens the valve 203 to communicate fluid from the alternative fluid source 214 to inlet manifold 212, the controller 260 may also prevent flow of the fracturing fluid 105 to the condenser via closing one or more (or all) of the valves 206, 207, 218, 219.

As another example, in some embodiments the controller 260 may determine that a particular one or more of the storage vessels 104 (e.g., one of the storage vessels 104a, 104b) has a temperature that is above a threshold via the corresponding temperature sensor 208, 209 at block 404 of method 400. In these circumstances, rather than shutting down operation of power generation assembly 150 and entirely shutting down the flow of fracturing fluid 105 to and from the condenser 216, block 406 of method 400 may include actuating suitable ones or combinations of the valves 206, 207, 218, 219 to selectively prevent communication between the particular storage vessel(s) 104 (e.g., one of the storage vessels 104a and 104b) and the condenser 216, but otherwise maintaining operation of the power generation assembly 150 as previously described.

In some embodiments, a temperature of the fracturing fluid may be compared to multiple, different thresholds. For instance, as shown in FIG. 5, method 500 may compare a temperature of the fracturing fluid to multiple, different thresholds so as to further direct subsequent steps and functions. The method 500 may include similar features to those previously described above for method 400 of FIG. 4. Thus, the features of method 500 that are shared with the method 400 may be identified with the same reference numbers.

In particular, method 500 includes receiving an indication of the temperature of the fracturing fluid at block 402 as previously describe for method 400 (FIG. 4). Next, method 500 includes determining if the temperature of the fracturing fluid is greater than a first threshold at block 502. If the temperature is not above the first threshold (the determination at block 502 is "No"), method 500 may return to repeat block 402.

If, on the other hand, it is determined that the temperature is above the first threshold (the determination at block 502 is "Yes"), then method 500 may proceed to output an alert at block 504. For instance, with respect to the power generation assembly 150 and hydraulic fracturing assembly 101 shown in FIG. 2, if the controller 260 determines that one or more of the temperature sensors 208, 209, 217 is detecting a temperature of the fracturing fluid 105 that is above the first threshold, the controller 260 may output an alert or alarm that may be detected (e.g., visually, audibly, tactically, or some combination thereof) by personnel. For instance, the controller 260 may output an alert signal to the user interface 263. Thus, in some embodiments, the alert output at block 504 may include a siren, a light, a pop-up window on a screen or monitor (e.g., user interface 263), or some combination thereof. In some embodiments, the alert output at block 504 may inform personnel that a temperature of the fracturing fluid is rising (e.g., due to interaction with the power generation assembly 150) so that closer monitoring of the situation or adjustments to a pressure and/or flow rate of a fluid (e.g., fracturing fluid 105, working fluid, heated exhaust, etc.) may be warranted. In some embodiments, the method 500 may include (in addition to or in lieu of block 504) automatically adjusting a pressure and/or flow rate of a fluid or fluids (e.g., fracturing fluid 105, working fluid, heated exhaust, etc.) within, to, or from the power generation assembly 150 to ensure proper operation and performance thereof in view of the elevated temperature of the fracturing fluid 105. In some embodiments, the controller 260 may adjust the pressure and/or flow rate of a fluid or fluids within, to, or from the power generation assembly by actuating one or more of the valves 203, 206, 207, 218, 219, 238, 240 and/or adjusting (e.g., raising or lowering) an operation speed or output of one or more pumps 215, 246 as previously described.

In some embodiments, the first threshold may be selected to be lower than an ultimate operating limit for the temperature of the fracturing fluid but may still be elevated from an expected or normal temperature range of the fracturing fluid during operations. In some embodiments, the first threshold may be selected to correspond with a temperature that would reduce the fracturing fluid's ability to serve as an effective heat sink within the heat exchanger 216 during operations.

As shown in FIG. 5, after it is determined that the temperature of the fracturing fluid is greater than the first threshold at block 502, the method 500 may proceed to determine if the temperature of the fracturing fluid is greater than a second threshold at block 506. In some embodiments, the second threshold of block 506 may be greater than the first threshold of block 502. For instance, the second threshold may be selected to correspond with an upper limit of an operating temperature range of one or more of the components that may hold or contain the fracturing fluid during operations (e.g., the storage vessels 104a, 104b, piping 106, 118, 122, etc. shown in FIG. 2). In some embodiments, the first threshold of block 502 may be some selected fraction or percentage of the second threshold (e.g., 10%, 25%, 50%, 75%, etc.). Thus, in some embodiments, the first threshold of block 502 may be referred to as a low (or low-high) threshold or limit, and the second threshold at block 506 may be referred to as a high (or high-high) threshold or limit for the temperature of the fracturing fluid.

If it is determined at block 506 that the temperature of the fracturing fluid is greater than the second threshold (the determination at block 506 is "Yes"), the method 500 may proceed to shut down at least one of an operation of the power generation assembly or a flow of the fracturing fluid to the condenser at block 406 as previously described above for method 400 in FIG. 4. If, on the other hand, it is determined at block 506 that the temperature of the fracturing is not above the second threshold at block 506 (the determination at block 506 is "No"), the method 500 may return to repeat block 402.

Figure 6:
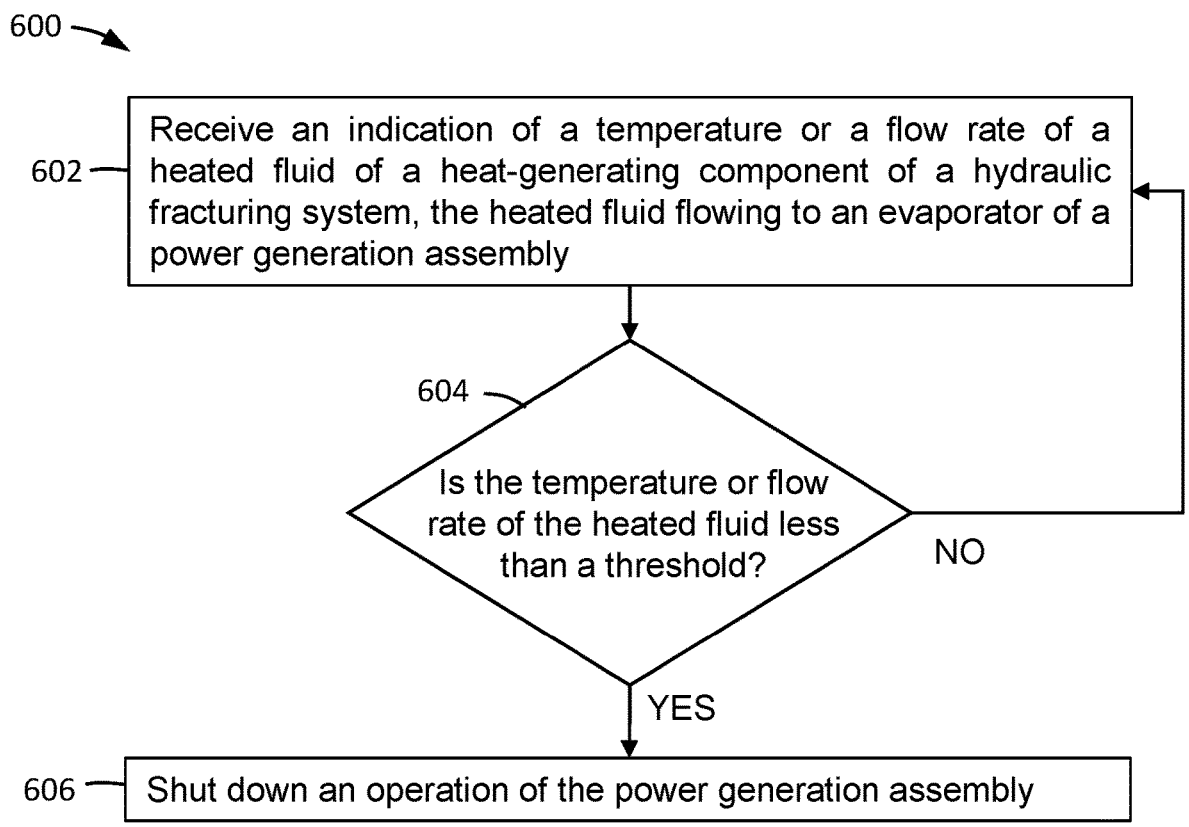

As shown in FIG. 6, an embodiment of method 600 is shown. Method 600 may be utilized to control the operation of a power generation assembly based on a temperature or flow rate of heated fluid of a heat-generating component of a hydraulic fracturing assembly that is circulated to the power generation assembly to heat a working fluid thereof. In some embodiments, method 600 may be representative of an embodiment of the heat control instructions 303 as shown in FIG. 3. For instance, for the hydraulic fracturing assembly 101 and power generation assembly 150 shown in FIG. 2, the controller 260 may monitor the temperature and/or the flow rate of the heated exhaust flowing through piping 234 to determine whether the heat-generating component 232 is providing a suitable amount of heat energy to operate the power generation assembly 150.

The method 600, for example, includes receiving an indication of a temperature or a flow rate of a heated fluid of a heat-generating component of a hydraulic fracturing system at block 602. The heated fluid may be flowing to an evaporator of a power generation assembly. For instance, for the hydraulic fracturing assembly 101 and power generation assembly 150 shown in FIG. 2, the controller 260 may receive an indication of a temperature and flow rate of the heated exhaust via the sensors 235, 239, respectively.

The method 600 also includes determining whether the temperature or flow rate of the heated fluid is below a threshold at block 604. The threshold (for either the temperature or the flow rate) may be set based on an amount of heat necessary to achieve a desired temperature increase in the working fluid of the power generation assembly. For instance, for the hydraulic fracturing assembly 101 and power generation assembly 150 shown in FIG. 2, the threshold for either the temperature or the flow rate of the heated exhaust in piping 234 may be set so as to ensure that sufficient heat is transferred to the working fluid in the evaporator 236 such that the working fluid is vaporized (or substantially vaporized/energized) for injection into the expander 242 as previously described.

As shown in FIG. 6, if it is determined that the temperature or flow rate is equal to or greater than the threshold at block 504 (the determination at block 604 is "no"), method 600 may return to block 602 to once again receive an indication of the temperature or flow rate of the heated fluid. If, on the other hand, it is determined that the temperature or flow rate of the heated fluid is below the threshold at block 604 (the determination at block 604 is "yes"), method 600 may proceed to shut down an operation of the power generation assembly at block 606. In some embodiments, block 606 may include any one or more of the actions described above for block 406 of method 600 (FIG. 4), including shutting down the power generation assembly (e.g., power generation assembly 150) and bypassing the heated fluid away from the power generation assembly. Thus, block 606 may be performed in response to the determination that the temperature or flow rate of the heated fluid is below the threshold at block 604.

In some embodiments, the method 600 may include comparing the temperature or flow rate of the heated fluid to multiple, different thresholds. For instance, as is similarly described herein for the method 500 previously described (FIG. 5), the method 600 may include initially determining whether the temperature or flow rate of the heated fluid is less than a first threshold, and then determining whether the temperature or flow rate of the heated fluid is less than a second threshold. The first threshold may be higher than the second threshold (e.g., the second threshold may correspond with the threshold of block 604 and the first threshold may be greater than the second threshold).

Thus, if it is determined that the temperature or flow rate of the heated fluid is less than the first threshold an alert (or alarm) may be output that is detectable by personnel as previously described above for block 504 of the method 500 (FIG. 5). Additionally or alternatively, as is also previously described above, if it is determined that the temperature or flow rate of the heated fluid is less than the first threshold, the method 600 may include automatically adjusting a pressure and/or flow rate of a fluid or fluids (e.g., fracturing fluid 105, working fluid, heated exhaust, etc.) within, to, or from the power generation assembly (e.g., power generation assembly 150) to ensure proper operation and performance thereof in view thereof in view of the lowered temperature of flow rate of the heated fluid. Further, if it is determined that the temperature or flow rate of the heated fluid is also lower than the second threshold, the method 600 may proceed to shut down an operation of the power generation assembly per block 606 as previously described.

Figure 7:
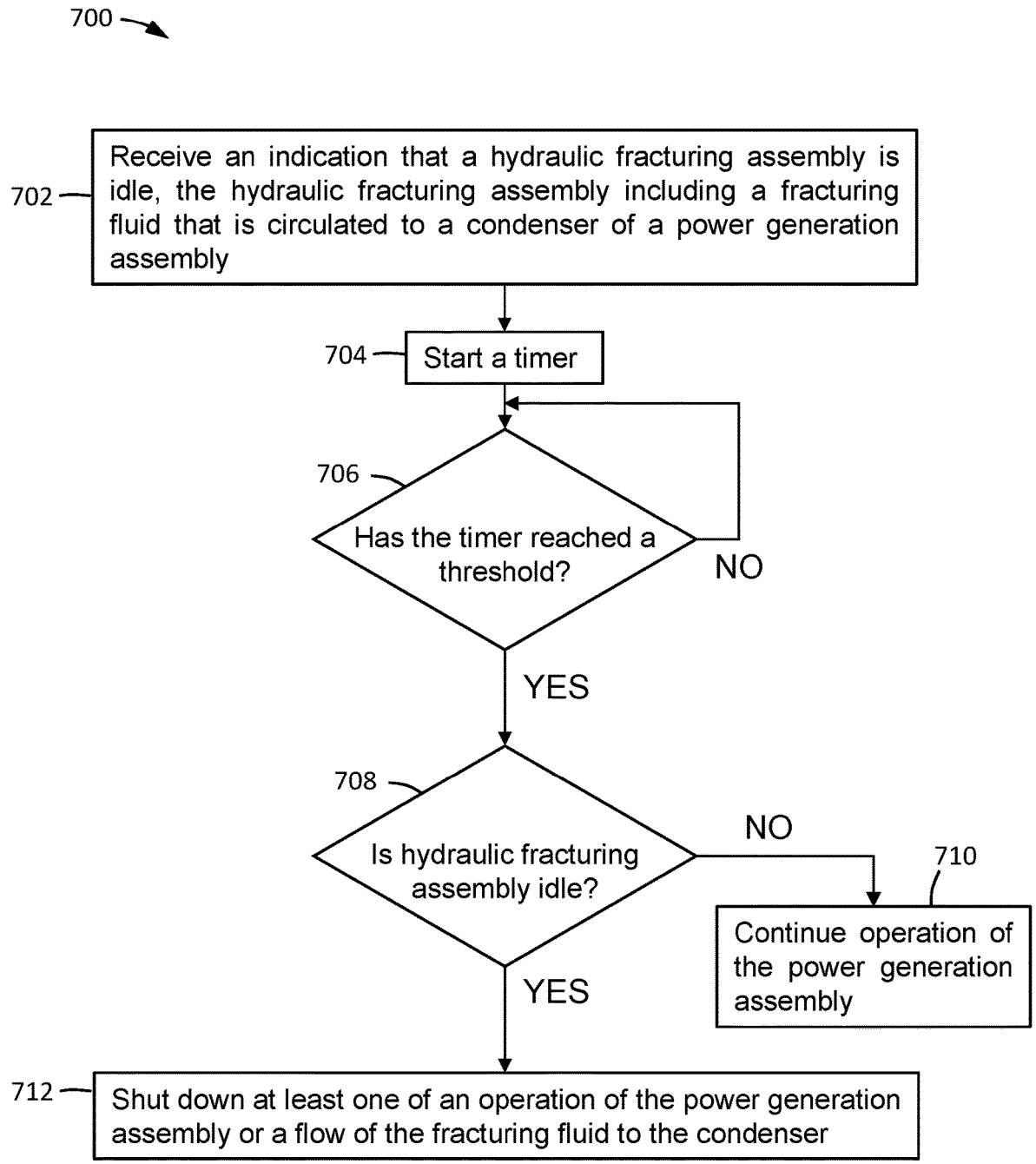

As shown in FIG. 7, an embodiment of method 700 is shown. Method 700 may be utilized to control the operation of a power generation assembly based on whether a hydraulic fracturing assembly, which is supplying a fracturing fluid to cool a working fluid of the power generation assembly, is operating. In some embodiments, method 700 may be representative of an embodiment of the time control instructions 304 shown in FIG. 3. For instance, for the hydraulic fracturing assembly 101 and power generation assembly 150 shown in FIG. 2, the controller 260 may assume or determine that a temperature of the fracturing fluid 105 is (or is likely) above a desired operating range based on an amount of time that the hydraulic fracturing assembly 101 is idle (e.g., and therefore not injecting the fracturing fluid 105 into the wellbore 103 to dissipate heat as previously described).

The method 700 may include receiving an indication that a hydraulic fracturing assembly is idle at block 702. The hydraulic fracturing assembly includes a fracturing fluid that is circulated to a heat exchanger of a power generation assembly. For instance, for the hydraulic fracturing assembly 101 and power generation assembly 150 shown in FIG. 2, the controller 260 may be connected to one or more components or sensors of the hydraulic fracturing assembly 101 (e.g., flow sensors, temperature sensors, pumps, volt or current meters, etc.) and/or may be communicatively connected to another controller that is connected to one or more components or sensors of the hydraulic fracturing assembly 101 such that during operations, controller 260 may determine that the hydraulic fracturing assembly 101 is idle. In another example, a person may indicate, via the user interface 263 to the controller 260, that the hydraulic fracturing assembly 101 is idle.

The method 700 also includes starting a timer at block 704, and then determining whether the timer has reached a threshold at block 706. The threshold at block 706 may be set based on an amount of time that the power generation assembly may circulate the fracturing fluid while the hydraulic fracturing assembly is idle before the temperature of the fracturing fluid raises above a desired value or range. For instance, for the hydraulic fracturing assembly 101 and power generation assembly 150 shown in FIG. 2, once controller 260 determines that the hydraulic fracturing assembly 101 is idle, the controller 260 may initiate a timer or other suitable timing sequence (e.g., block 704) to limit the amount of time that power generation assembly 150 may be operated (e.g., including circulation of fracturing fluid 105 to and from the condenser 216). The maximum time (e.g., the threshold in block 706) that the controller 260 may allow operation of the power generation assembly 150 while the hydraulic fracturing assembly 101 is idle may be determined based on the assumed rate of temperature increase within the storage vessels 104a, 104b (or elsewhere in the piping 118, 122) due to the heat transferred to the fracturing fluid 105 within the condenser 216 and a maximum operating temperature of one or more components of the hydraulic fracturing assembly 101, power generation assembly 150 (or system 100 more broadly) (e.g., storage vessels 104, piping 106, 118, 122, etc.). The controller 260, for example, may determine the rate of temperature increase in the storage vessels 104a, 104b based on the output of one or more of the temperature sensors 208, 209, 217, 222 in some embodiments.

As shown in FIG. 7, if it is determined that the timer has not yet reached the threshold at block 606 (the determination at block 706 is "No") method 700 may repeat block 706. If, on the other hand, it is determined that the timer has reached the threshold at block 706 (e.g., the determination at block 706 is "yes"), method 700 may proceed to block 708 to determine if the hydraulic fracturing assembly is idle after the time threshold has been reached. If it is determined that the hydraulic fracturing assembly is no longer idle at block 708 (e.g., the determination at block 708 is "no"), then method 700 may proceed to continue operation of the power generation assembly at block 710. If, on the other hand, it is determined that that the hydraulic fracturing assembly is still (or remains) idle at block 708 (e.g., the determination at block 708 is "yes"), the method 700 may proceed to shut down at least one of an operation of the power generation assembly or a flow of the fracturing fluid to the condenser at block 712. In some embodiments, block 712 may include any one or more of the actions described above for block 406 of method 400 (FIG. 4). Thus, block 712 may be performed in response to the determinations that the timer has reached the threshold at block 606 and that the hydraulic fracturing assembly is still idle at block 608.

Figure 8:
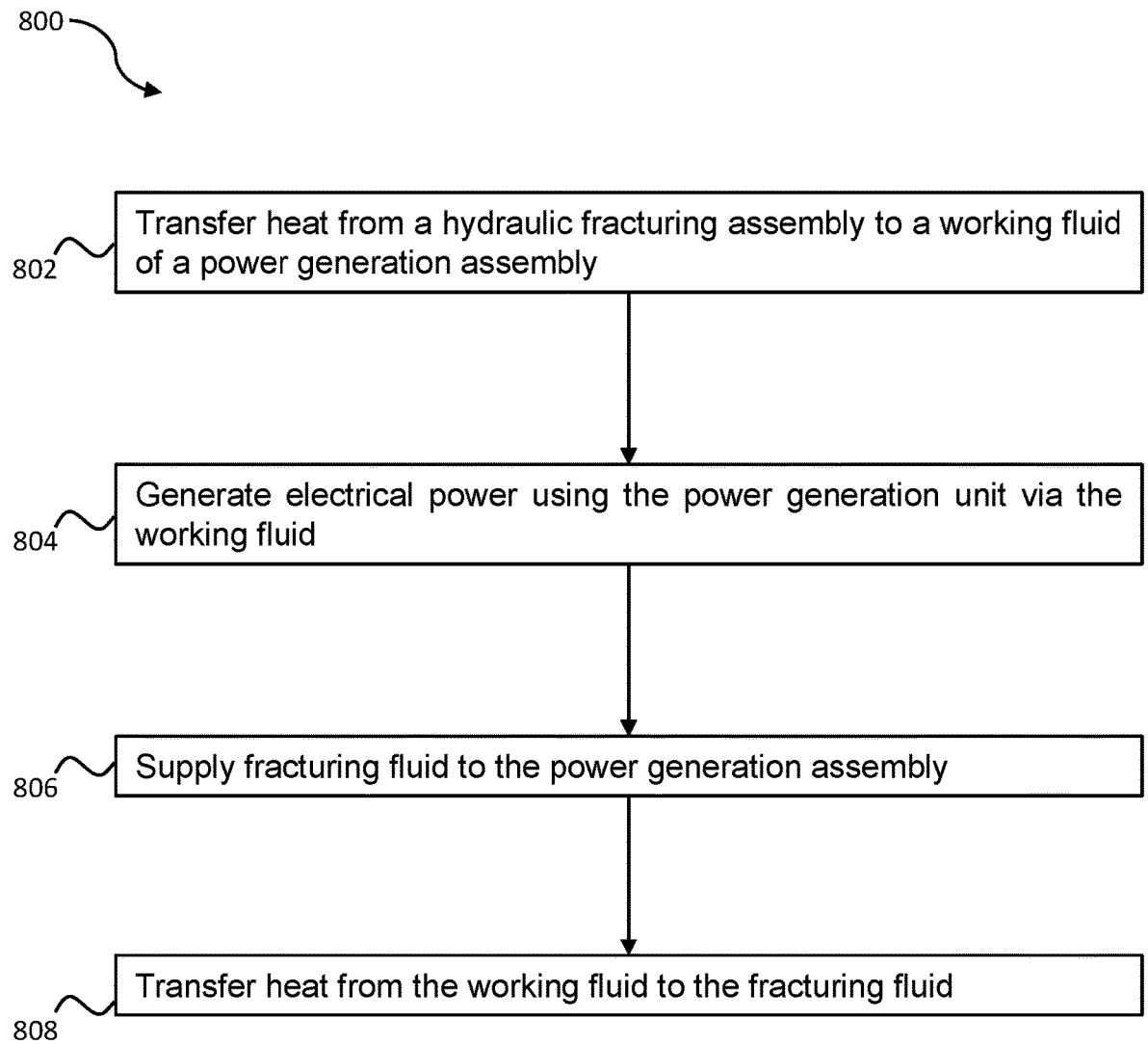

As shown in FIG. 8, a method 800 of operating a power generation assembly (e.g., power generation assembly 150) that circulates one or more fluids of a hydraulic fracturing assembly (e.g., hydraulic fracturing assembly 101) according to some embodiments is shown. In some embodiments, the method 800 may be performed using the system 100 shown in FIG. 1 (including the hydraulic fracturing assembly 101 and power generation assembly 150 shown in FIG. 2). Thus, in describing the features of method 800, reference will be made to the systems and assemblies of FIGS. 1 and 2. However, it should be appreciated that method 800 may be practiced with systems and assemblies that are different from those shown in FIGS. 1 and 2. Thus, reference to the systems and assemblies of FIGS. 1 and 2 should not be interpreted as limiting all potential implementations of method 800. In some embodiments, method 800 may be repeated, performed in different orders, omitted, and/or performed in parallel with or a partially overlapping in time manner with other operations or methods.

Initially, method 800 includes transferring heat from a hydraulic fracturing assembly to a working fluid of a power generation assembly at block 802. The power generation assembly may be positioned proximate to (e.g., at the same worksite or wellsite) as the hydraulic fracturing assembly. The transfer of heat at block 802 may include connecting a heat source of the hydraulic fracturing assembly to a heat exchanger of the power generation assembly, so that a temperature of the working fluid may be increased. For instance, for the hydraulic fracturing assembly 101 and power generation assembly 150 shown in FIG. 2, a heated exhaust produced from a heat-generating component 232 of the hydraulic fracturing assembly 101 may flow to an evaporator 236 positioned along the working fluid circuit 152 of the power generation assembly 150. As previously described, the heat transferred to the working fluid from the heated exhaust within the evaporator 236 may cause the working fluid to vaporize (or partially vaporize), thereby producing a vaporized working fluid.

Method 800 also includes generating electrical power using the power generation assembly via the working fluid at block 804. In some embodiments, block 804 may include circulating the working fluid along a working fluid circuit to actuate an electrical generator to generate electrical power. In some embodiments, the heat transferred to the working fluid at block 802 may facilitate the generation of electrical power at block 804 by changing a phase of the working fluid prior to routing the working fluid through an expander or other suitable device positioned within the power generation assembly to thereby generate electrical power. For instance, for the hydraulic fracturing assembly 101 and power generation assembly 150 shown in FIG. 2, the vaporized working fluid emitted from the evaporator 236 may flow along the working fluid circuit 152 to expander 242, within which the working fluid is expanded so as to turn the shaft 243 and actuate the electrical generator 244.

The method 800 also includes supplying fracturing fluid to the power generation assembly at block 806 and transferring heat from the working fluid to the fracturing fluid of the hydraulic fracturing at block 808. For instance, for the hydraulic fracturing assembly 101 and power generation assembly 150 shown in FIG. 2, the fracturing fluid 105 is supplied to the condenser 216 of the power generation assembly 150 from storage vessels 104a, 104b via inlet piping 118 within which heat is transferred from the working fluid to the fracturing fluid 105. Thereafter, the heated fracturing fluid 105 is emitted from the condenser 216 and returns to the storage vessels 104a, 104b.

In some embodiments, the method 800 may also include dissipating heat from the fracturing fluid into the hydraulic fracturing assembly by injecting the fracturing fluid into a wellbore as part of a hydraulic fracturing operation utilizing the hydraulic fracturing assembly. For instance, for the system 100 shown in FIG. 1, heat that is transferred to the fracturing fluid 105 via the one or more power generation assemblies 150 is dissipated into the wellbore 103 (and subterranean formation) as a result of injecting the fracturing fluid 105 into the wellbore 103 as part of a hydraulic fracturing operation as previously described.

The embodiments disclosed herein provide systems and methods for locally generating electrical power for a hydraulic fracturing operation that may utilize one or more fluids of the hydraulic fracturing operation. For instance, some embodiments are directed to a power generation assembly that may circulate a fracturing fluid of the hydraulic fracturing assembly to cool the working fluid so as to avoid use of large heat exchange devices that dissipate thermal energy to the surrounding environment. In addition, in some embodiments, a power generation assembly may utilize heat generated by one or more heat-generating components of the hydraulic fracturing assembly to heat the working fluid to avoid the need for additional heat sources within the power generation assembly. Thus, through use of the embodiments disclosed herein, a power generation assembly may be more effectively integrated within a hydraulic fracturing system, such that the efficiency of the power generation assembly and the hydraulic fracturing system may be increased.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. Further, when used herein (including in the claims), the words "about," "generally," "substantially," "approximately," and the like, when used in reference to a stated value mean within a range of plus or minus 10% of the stated value.

This application claims priority to, and the benefit of U.S. Provisional Application No. 63/480,197, filed Jan. 17, 2023, titled "POWER GENERATION ASSEMBLIES FOR HYDRAULIC FRACTURING SYSTEMS," and U.S. Provisional Application No. 63/477,571, filed Dec. 29, 2022, titled "POWER GENERATION ASSEMBLIES FOR HYDRAULIC FRACTURING SYSTEMS," the disclosures of which are incorporated herein by reference in their entireties.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system comprising:
a hydraulic fracturing assembly configured to inject a fracturing fluid into a subterranean formation, the hydraulic fracturing assembly including a fracturing fluid reservoir;
a power generation assembly including:
an electrical generator,
a working fluid circuit connected to the electrical generator such that circulation of a working fluid along the working fluid circuit actuates the electrical generator to generate electrical power, an evaporator connected along the working fluid circuit and connected to an exhaust outlet of the hydraulic fracturing assembly such that heat is transferred from exhaust emitted from the exhaust outlet to the working fluid, and a condenser connected along the working fluid circuit, the condenser fluidly connected to the fracturing fluid reservoir such that heat is transferred from the working fluid to the fracturing fluid within the condenser; and a controller communicatively connected to the power generation assembly and configured to:
receive an indication of a temperature or a flow rate of the exhaust, and
adjust flow rate of one or more of exhaust or working fluid based on the indication of the temperature or the flow rate of the exhaust.

2. The system of claim 1, wherein the evaporator is fluidly connected to the hydraulic fracturing assembly such that heat is transferred from the hydraulic fracturing assembly to the working fluid within the evaporator.

3. The system of claim 2, wherein the evaporator fluidly is connected to an exhaust outlet of a prime mover of the hydraulic fracturing assembly.

4. The system of claim 3, wherein the prime mover comprises one or more of: (a) a prime mover of a hydraulic fracturing pump of the hydraulic fracturing assembly, or (b) a gas-fired turbine of the hydraulic fracturing assembly.

5. The system of claim 3, wherein the controller is configured to:
receive an indication of a temperature of the fracturing fluid within the fracturing fluid reservoir, and shut down operation of the power generation assembly based on the indication of the temperature.

6. The system of claim 5, wherein the controller further is configured to shut down operation of the power generation assembly based on the indication of the temperature or the flow rate of the exhaust.

7. The system of claim 2, wherein the power generation assembly further comprises an expander connected along the working fluid circuit between the evaporator and the condenser, the expander connected to the electrical generator such that flow of the working fluid through the expander is to actuate the electrical generator.

8. The system of claim 1, further comprising outlet piping to connect the condenser and the fracturing fluid reservoir.

9. The system of claim 1, further comprising a manifold fluidly connected between fracturing fluid reservoir and the condenser, the manifold also fluidly connected to an alternative fluid source, the alternative fluid source comprises at least one of a river, a lake, or a stream.

10. The system of claim 9, wherein the hydraulic fracturing assembly further comprises a second fracturing fluid reservoir fluidly connected to the manifold in parallel with the fracturing fluid reservoir.

11. A method comprising:
transferring heat from a hydraulic fracturing assembly to a working fluid of a power generation assembly, the hydraulic fracturing assembly to inject a fracturing fluid into a subterranean formation;
circulating the working fluid in a working fluid circuit within the power generation assembly to generate electrical power;
transferring heat from the working fluid to the fracturing fluid; and
adjusting a flow of one or more of the fracturing fluid or exhaust to an evaporator of the power generation assembly based on a determination that a temperature of the fracturing fluid is greater than a first threshold.

12. The method of claim 11, further comprising:
determining a temperature of the fracturing fluid;
determining that the temperature is above a second threshold;
shutting down operation of the power generation assembly in response to the determination that the temperature is above the second threshold; and
outputting an alert based on a determination that the temperature of the fracturing fluid is greater than a third threshold, the third threshold being a temperature less than the second threshold.

13. The method of claim 11, wherein the transferring heat from a hydraulic fracturing assembly comprises flowing an exhaust of a prime mover of the hydraulic fracturing assembly to the evaporator of the power generation assembly.

14. The method of claim 13, wherein the transferring of heat from the working fluid comprises:
flowing the fracturing fluid from a fracturing fluid reservoir of the hydraulic fracturing assembly to a condenser connected along the working fluid circuit of the power generation assembly, and
flowing the fracturing fluid from the condenser back to the fracturing fluid reservoir.

15. The method of claim 11, further comprising:
determining that the hydraulic fracturing assembly is idle; and
shutting down operation of the power generation assembly based on the determination that the hydraulic fracturing assembly is idle.

16. The method of claim 15, wherein the shutting down comprises:
starting a timer in response to the determination,
determining that the hydraulic fracturing assembly remains idle when the timer reaches a threshold, and
shutting down operation of the power generation assembly based on the determination remains idle.

17. The method of claim 11, wherein the transferring heat from the working fluid comprises:
flowing the fracturing fluid from a plurality of fracturing fluid reservoirs to a manifold,
flowing the fracturing fluid from the manifold to a condenser connected along the working fluid circuit of the power generation assembly, and
flowing the fracturing fluid from the condenser back to the plurality of fracturing fluid reservoirs.

18. The method of claim 17, further comprising:
flowing the fracturing fluid from the plurality of fracturing fluid reservoirs into the subterranean formation via the hydraulic fracturing assembly; and
transferring heat from the fracturing fluid to the hydraulic fracturing assembly during the flowing the fracturing fluid from the plurality of fracturing fluid reservoirs.

19. The method of claim 18, further comprising flowing a fluid from an alternative fluid source to the manifold, the alternative fluid source comprises at least one of a river, a lake, or a stream.

20. The method of claim 13,
wherein the power generation assembly comprises:
a condenser,
evaporator, and
an expander, the expander positioned between the condenser and the evaporator along the working fluid circuit, wherein circulating the working fluid comprises flowing the working fluid through the evaporator, the expander, and the condenser, wherein the transferring heat from the hydraulic fracturing assembly comprises flowing a heated fluid from a heat generating component of the hydraulic fracturing assembly to the evaporator, and wherein the transferring heat from the working fluid comprises flowing the fracturing fluid from a fracturing fluid reservoir to the condenser.

21. A system comprising:
a hydraulic fracturing assembly configured to inject a fracturing fluid into a subterranean formation;
a power generation assembly including:
an electrical generator,
a working fluid circuit connected to the electrical generator such that circulation of a working fluid along the working fluid circuit actuates the electrical generator to generate electrical power, and
a condenser connected along the working fluid circuit, the condenser fluidly connected to the hydraulic fracturing assembly such that heat is transferred from the working fluid to the fracturing fluid within the condenser; and
a controller communicatively connected the power generation assembly and configured to:
receive an indication of a temperature of the fracturing fluid,
shut down operation of the power generation assembly based on the indication of the temperature,
receive an indication of one or more of a temperature or a flow rate of an exhaust emitted from the exhaust outlet, and
adjusting the flow rate of one or more of the exhaust or working fluid to the condenser based on the indication of one or more of the temperature or the flow rate of the exhaust.

22. The system of claim 21, wherein the power generation assembly further comprises an evaporator connected along the working fluid circuit, the evaporator fluidly connected to the hydraulic fracturing assembly such that heat is transferred from a heated fluid of the hydraulic fracturing assembly to the working fluid within the evaporator.

23. The system of claim 22, wherein the controller further is configured to:
receive an indication of the temperature or flow rate of the heated fluid, and
shut down operation of the power generation assembly based on the indication of the temperature or the flow rate of the heated fluid.

24. The system of claim 22, wherein the heated fluid includes an exhaust of a prime mover of the hydraulic fracturing assembly.

25. The system of claim 24, wherein the prime mover comprises one or more of: (a) a prime mover of a hydraulic fracturing pump of the hydraulic fracturing system, or (b) a gas-fired turbine of the hydraulic fracturing assembly.

26. The system of claim 22, wherein the power generation assembly further comprises an expander connected along the working fluid circuit between the evaporator and the condenser, the expander connected to the electrical generator such that flow of the working fluid through the expander is to actuate the electrical generator.

27. The system of claim 26, further comprising a manifold fluidly connected between fracturing fluid reservoir and the condenser, and wherein the manifold fluidly is connected to an alternative fluid source that includes at least one of a river, a lake, or a stream.

28. The system of claim 27, wherein the hydraulic fracturing assembly further comprises a second fracturing fluid reservoir fluidly connected to the manifold in parallel with the fracturing fluid reservoir.

29. A method comprising:
receiving an indication of a temperature of a fracturing fluid that is circulating between a fracturing fluid reservoir of a hydraulic fracturing assembly and a condenser of a power generation assembly;
determining that the temperature of the fracturing fluid is greater than a first threshold;
shutting down at least one of an operation of the power generation assembly or a flow of the fracturing fluid to the condenser based on the determination that the temperature of the fracturing fluid is greater than the first threshold;
determining that the temperature of the fracturing fluid is greater than a second threshold, the second threshold being less than the first threshold; and
outputting an alert based on the determination that the temperature of the fracturing fluid is greater than the second threshold.

30. A method comprising:
(a) flowing a working fluid through an evaporator of a power generation assembly to increase a temperature of the working fluid;
(b) flowing the working fluid through an expander of the power generation assembly after (a);
(c) actuating an electrical generator during and as a result of (b) to generate electrical power;
(d) flowing the working fluid through a condenser after (b);
(e) flowing a fracturing fluid of a hydraulic fracturing assembly from a fracturing fluid reservoir to the condenser during (d);
(f) cooling the working fluid and heating the fracturing fluid within the condenser during (d) and (e); and
(g) outputting an alert based on the temperature so that when the alert is output, the temperature is less than an amount that causes shut down or adjustment of the at least one of the operation of the power generation assembly or the flow of the fracturing fluid to the condenser.

31. The method of claim 30, further comprising:
(h) flowing a heated fluid from the hydraulic fracturing assembly to the evaporator.

32. The method of claim 31, wherein (h) comprises flowing a heated exhaust from a heat-generating component of the hydraulic fracturing assembly to the evaporator.

33. The method of claim 32, further comprising:
(i) detecting a temperature of the fracturing fluid; and
(j) shutting down at least one of an operation of the power generation assembly or a flow of the fracturing fluid to the condenser based on the temperature.

34. The method of claim 33, further comprising:
(k) determining that the hydraulic fracturing assembly is idle; and
(l) shutting down at least one of an operation of the power generation assembly or a flow of the fracturing fluid to the condenser based on (k).

* * * * *